United States Patent
Akao

Patent Number: 6,060,137
Date of Patent: May 9, 2000

[54] PACKAGE EASY-TO-OPEN FOR PHOTOSENSITIVE MATERIAL

[75] Inventor: Mutsuo Akao, Minami-Ashigara, Japan

[73] Assignee: Fuji Photo Film Co., Ltd., Kanagawa-ken, Japan

[21] Appl. No.: 08/896,858

[22] Filed: Jul. 18, 1997

[30] Foreign Application Priority Data

Jul. 18, 1996 [JP] Japan ................................. 8-207713

[51] Int. Cl.⁷ .......................... B29D 22/00; B32B 27/08; B32B 27/32; B32B 27/36

[52] U.S. Cl. .................. 428/35.2; 428/323; 428/483; 428/515; 428/523; 428/910

[58] Field of Search ...................... 428/35.2, 500, 428/516, 910, 483, 323, 515, 523

[56] References Cited

U.S. PATENT DOCUMENTS

| | | | |
|---|---|---|---|
| 4,452,846 | 6/1984 | Akao | 405/299 |
| 4,579,781 | 4/1986 | Akao | 428/461 |
| 4,925,711 | 5/1990 | Akao et al. | 428/35.2 |
| 5,118,563 | 6/1992 | Akao | 428/334 |
| 5,169,696 | 12/1992 | Lang et al. | 428/35.2 |
| 5,294,695 | 3/1994 | Lee et al. | 528/379 |
| 5,510,177 | 4/1996 | Masuyama et al. | 428/323 |

FOREIGN PATENT DOCUMENTS

| | | |
|---|---|---|
| B-2-2700 | 1/1990 | Japan . |
| B-2-2701 | 1/1990 | Japan . |
| UM-B-2-19226 | 5/1990 | Japan . |
| UM-B-5-2919 | 1/1993 | Japan . |
| A-6-214350 | 8/1994 | Japan . |
| B-7-1380 | 1/1995 | Japan . |
| A-7-257510 | 10/1995 | Japan . |

OTHER PUBLICATIONS

Park, Plastics Film Technology, pp. 26–33, May 1970.
Cowie, Polymers: Chemistry and Physics of Modern Materials, pp. 337–338 1991.

*Primary Examiner*—Paul Thibodeau
*Assistant Examiner*—Ramsey Zacharia
*Attorney, Agent, or Firm*—Sughrue, Mion, Zinn, Macpeak & Seas, PLLC

[57] ABSTRACT

It is provided a package easy-to-open for photosensitive material such as an easy-to-open packaged photosensitive material having at least a biaxially stretched plastic film layer and, as an innermost layer, a heat-sealing layer containing not less than 5 wt % of an ethylene copolymer resin and/or a thermoplastic elastomer. At least one layer of the layered film has light shielding performance, and at least one layer other than the biaxially stretched plastic film layer has a ratio of the tear strength in the direction normal to the flow direction to the tear strength in the flow direction of not less than 3. The package has physical strength such as impact resistance, complete hermetic sealing performance, complete light shielding performance, and amenability of discarding and recycling without affecting the quality of the photosensitive material.

18 Claims, 13 Drawing Sheets

FIG. 16-1A
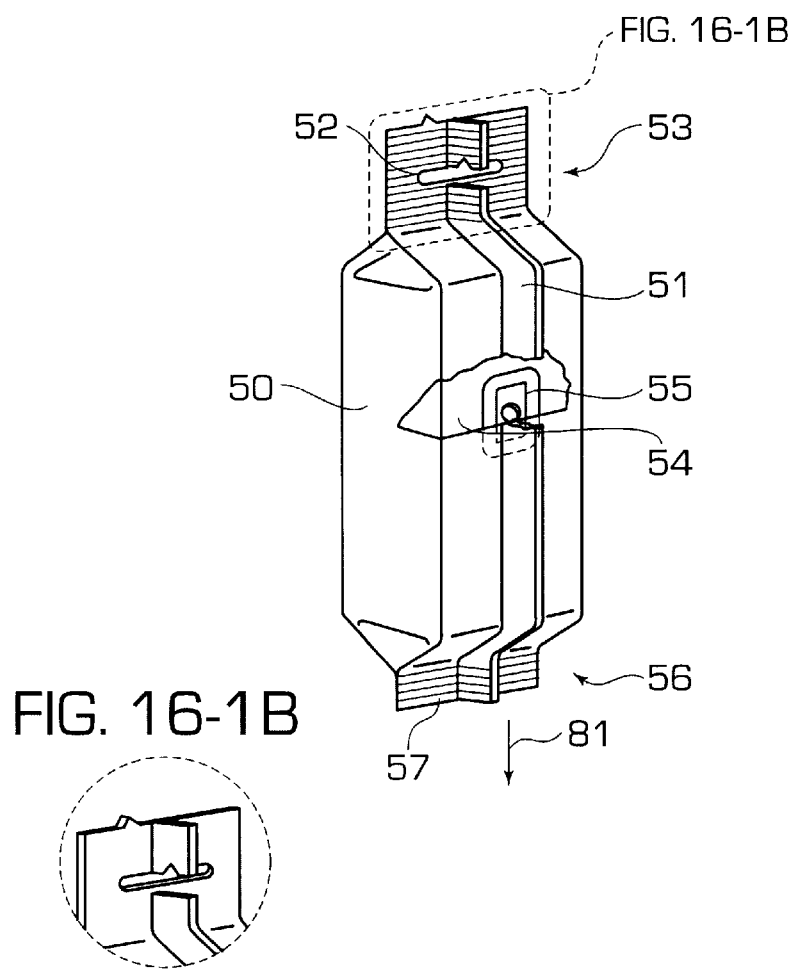
FIG. 16-1B
FIG. 16-2
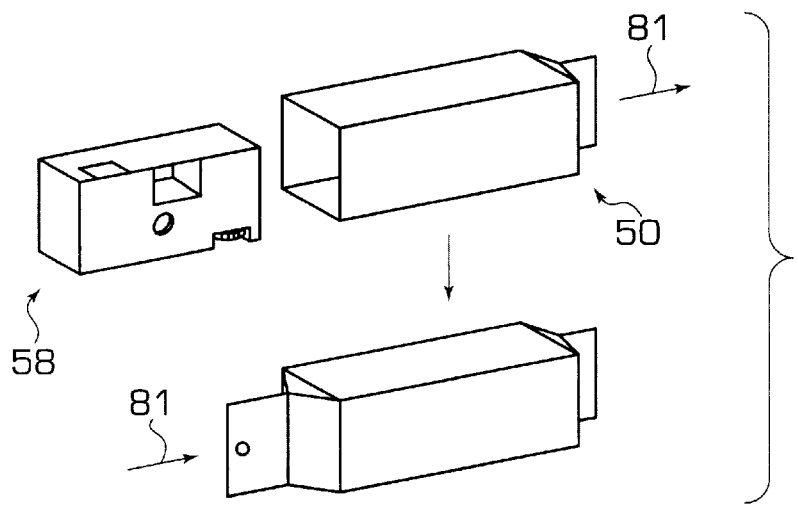

STRETCHING

HEAT TREATMENT

PACKAGE EASY-TO-OPEN FOR PHOTOSENSITIVE MATERIAL

TECHNICAL FIELD OF THE INVENTION

This invention relates to a package easy-to-open for photosensitive material, particularly, an easy-to-open packaged photosensitive material. More particularly, it relates to a package easy-to-open for photosensitive material having excellent hermetic sealing properties, easy-to-tear performance, that is easy-to-open performance, excellent physical strength, such as impact strength or Gelbo test strength, high heat-sealing amenability, especially high chronological heat-sealing strength, and optimum light-shielding properties.

BACKGROUND OF THE INVENTION

With respect to photosensitive materials which lose the qualitative values by exposing them to light, known packaging bags can shield light completely. In such cases, the package is required to have not only complete light-shielding properties, but also freeness from ill effects on photographic performance, various physical strength (bursting strength, tear strength, impact puncture strength, Gelbo test strength, tensile strength, and the like), and have excellent heat sealing properties (heat-sealing strength, sealing properties against foreign matter, hot sealing strength or chronological heat sealing strength, and the like), anti-static properties, amenability to recycling, amenability to incineration, and the like. The following techniques, for example, have so far been disclosed for meeting these characteristics.

A film for packaging a photosensitive material having at least one layer of a light-shielding film comprised of a polyethylene based polymer and not less than 1 wt % of a light-shielding material, with not less than 50 wt % of the total polyethylene based polymer being linear low-density polyethylene (JP Patent Kokoku JP-B-2-2700). A packaging material for a photosensitive material comprised of a layered material made up of a substrate and a polyethylene based polymer layer formed on at least one surface of the substrate, in which the polyethylene based polymer layer is formed of not less than 50 wt % of linear low density polyethylene substantially free of a light shielding material and in which the layered material has a light-shielding layer sufficient for light shielding (JP Patent Kokoku JP-B-2-2701). An easy-to-open packaging material for a photosensitive material comprised of an inner light-shielding heat-sealable film layer containing a lubricant, a light-shielding material and not less than 50 wt % of the high-pressure low-density polyethylene resin, an aluminum foil layer layered on the light-shielding heat-sealable film layer, with a peeling strength of 400 g/15 mm width or more and having an anchor coating layer towards the light-shielding heat-sealable film layer, and a heat-resistant flexible sheet layer layered on the aluminum foil layer and having heat resistant properties of not less than 5° C. with respect to the light-shielding heat-sealable film layer (JP Utility Model Kokoku JP-B-2-19226).

SUMMARY OF THE DISCLOSURE

In the course of the present invention, the following problems have been found.

Of these, the technique disclosed in JP Patent Kokoku JP-B-2-2700 is not optimum in easy-to-open performance, although it is superior in tear strength, Gelbo test strength, impact puncture strength or have excellent heat sealing properties, while being superior in tight sealing performance or in complete light-shielding performance required of the photosensitive material. The technique disclosed in JP Patent Kokoku JP-B-2-2701 is again not optimum in easy-to-open performance, even although it is superior in tear strength or bending strength. On the other hand, with the technique disclosed in JP Utility Model Kokoku JP-B-2-19226, it is difficult to maintain optimum tight sealing and light-shielding properties in, for example, the physical distribution processes, if the packaging material is processed into a roll or formed into a package of the sheet-like photosensitive material weighing not less than 500 g, since the material is low in tear strength or impact puncture strength and is deteriorated in heat sealing strength with lapse of time.

For assuring optimum tight sealing properties and optimum light-shielding performance required of a packaging material, it is crucial to increase the tear strength, Gelbo test strength or impact puncture strength. However, the easy-to-open performance is similarly crucial for product designing. Thus it has been desired to satisfy the two contradictory properties, namely the high physical strength and high easy-to-open characteristics. The above techniques were not sufficient in this respect. It is therefore an object of the present invention to provide a package easy-to-open for photosensitive material such as an easy-to-open packaged photosensitive material wherein the package used therein satisfies two contradictory characteristics, namely the high physical strength, optimum tight sealing properties and optimum light-shielding properties, and easy-to-open characteristics, and which exhibits amenability to disposal and recycling without adversely affecting the quality, such as photographic performance of the photosensitive material.

Still further objects will become apparent in the entire disclosure.

The present invention provides a package easy-to-open for photosensitive material made by employing and processing thereto a layered film comprised of a biaxially stretched plastic film layer having high physical strength, such as tensile strength, Gelbo test strength of impact puncture strength, and a heat-sealable layer containing pre-set components, at least one of the above layers being a light-shielding layer and at least one layer other than the biaxially stretched plastic film being molecular-oriented in the flowing direction for assuring the easy-to-open performance.

Stretching means mechanically extending a material, such as a plastic film, at a temperature lower than the melting point, for orienting the molecules in a direction parallel to the stretching direction. By this processing, the tensile strength in the stretching direction is significantly improved to increase toughness. Therefore, if the material is stretched in mutually perpendicular directions (bi-axial stretching), the resulting material is increased in physical strength, such as tensile strength, Gelbo test strength or impact puncture strength in either directions, thus assuring complete hermetic sealing properties of the packaged photosensitive material employing the packaging material and the package therefrom. By additionally providing a light-shielding layer, complete light-shielding properties are also assured.

If a plastic film, for example, is molecular-oriented only in one direction, the physical properties of the film in a direction perpendicular to the direction of molecular orientation are lowered, such that the film is liable to be torn in the direction of molecular orientation. Therefore, if there are provided a biaxially stretched plastic film layer, having high physical strength, such as tensile strength, a thermoplastic resin film layer containing pre-set components and a light-shielding layer, it becomes possible to produce a packaged photosensitive material which is improved in impact-proofness during transport, is not lowered in heat-sealing strength during transport and which exhibits superior tight sealing and complete light shielding performance. In addition, by layering a thermoplastic resin film layer that is ready to be torn off in the molecular-oriented direction, the packaged photosensitive material further exhibits unidirectional tear-off characteristics, that is easy-to-open characteristics.

Thus, the present invention provides a package easy-to-open for photosensitive material such as an easy-to-open packaged photosensitive material made by employing and processing thereto a layered film exhibiting complete light-shielding characteristics, at least including a biaxially stretched plastic film layer and a thermoplastic resin film layer containing at least 5 wt % of an ethylene copolymer resin and/or a thermoplastic elastomer, at least one layer of the layered film being a light-shielding layer exhibiting light-shielding characteristics, at least one layer other than the biaxially stretched plastic film layer being a molecular oriented plastic film layer having a ratio of the tear strength in a direction normal to the flowing direction, i.e., transverse direction (TD) to that in the flowing direction, i.e., longitudinal direction (MD), that is TD/MD, of not less than 3.

The reason the thermoplastic resin film layer contains not less than 5 wt % of an ethylene copolymer resin and/or a thermoplastic elastomer is to assure complete tight sealing characteristics for a pre-set time without deterioration in heat-sealing strength even on bleedout of the lubricant, anti-oxidant or monomers. By at least one layer of the layered film being a light-shielding layer exhibiting light-shielding characteristics, it becomes possible to assure complete light shielding characteristics of the packaged photosensitive material using them exhibiting easy-to-open characteristics.

The thermoplastic resin film layer being used as the innermost layer is desirable since this leads to improved amenability to heat sealing and photographic performance. If further 1 to 20 wt % of carbon black is contained in the thermoplastic resin film layer, the physical properties are desirably improved, while chronological deterioration in heat strength is reduced. In particular, if carbon black and the anti-oxidant and/or hydrotalcite compounds are added in combination to the thermoplastic resin film layer, it becomes possible to prevent thermal deterioration of the ethylene copolymer resin or the thermoplastic elastomer, to suppress generation of substances affecting photographic performance and to significantly improve physical strength and photographic performance. The innermost layer means a layer of the layered film closest to the photosensitive material. The flowing direction means the proceeding direction of the molecular-oriented plastic film layer having the TD/MD ratio of not less than 3 during its fabrication.

In the package easy-to-open for photosensitive material, such as an easy-to-open packaged photosensitive material of the present invention, the following embodiments are preferred.

At least 5 wt % of an ethylene-α-olefin copolymer resin with a melt flow rate of 0.1 to 10 g/10 minutes and a density of 0.870 to 0.950 g/cm$^3$ is contained in the molecular oriented plastic film layer having a ratio of the tear strength in a direction normal to the flowing direction to that in the flowing direction of not less than 3;

the molecular oriented plastic film layer having a ratio of the tear strength in a direction normal to the flowing direction to that in the flowing direction of not less than 3 is a multi-layered co-extruded film layer; and one or more sorts of the light-shielding materials is contained in said thermoplastic resin film.

The thermoplastic resin film layer serves as any one or both of the light-shielding layer and the molecular oriented plastic film layer.

The package easy-to-open for photosensitive material of the present invention can be fabricated by the method including the step of layering a biaxially stretched plastic film layer and a thermoplastic resin film layer with a peeling strength of not less than 350 g/15 mm width. The thermoplastic resin film layer containing not less than 5 wt % of an ethylene copolymer resin and/or a thermoplastic elastomer has a ratio of the tear strength in a direction normal to the flowing direction to that in the flowing direction of not less than 3.

In the present invention, the range of numerical figures includes not only both limit values but also all intermediate values comprised between these two limit values.

EMBODIMENTS OF THE INVENTION

The present invention provides a package easy-to-open for photosensitive material, such as an easy-to-open packaged photosensitive material comprised of a layered film at least including a biaxially stretched plastic film layer and a pre-set thermoplastic resin film layer, at least one of the layers of the layered film being a light-shielding layer exhibiting light-shielding properties and at least one layer other than biaxially stretched plastic film layer being molecular-oriented for having a pre-set tear strength ratio.

Stretching means mechanically extends a material, such as a plastic film, at a temperature equal or lower than the melting point of the plastic material, for orienting the molecules in a direction parallel to the stretching direction. By this processing, the tensile strength in the stretching direction is significantly improved to increase toughness. However, the plastic film is lowered in this case in tear strength in a direction parallel to the stretching direction and becomes susceptible to tearing. Thus, by stretching the plastic film in the flowing direction and in a direction perpendicular thereto, by way of biaxial stretching, the physical strengths in both directions, such as tensile strength, tear strength, Gelbo test strength or impact puncture strength, are improved. By providing the biaxially stretched plastic film layer, the physical strength or hermetic sealing performance of the packaged photosensitive material is improved. The present invention has been the first to discover that, with a layered film comprised of a thermoplastic resin film layer having a ratio of the tear strength in a direction normal to the flowing direction to that in the flowing direction of not less than 3 and a biaxially stretched plastic film layer layered together with a peeling strength of not less than 350 g/15 mm width, the easy-to-open characteristics in the flowing direction are improved beyond expectations such that the film may be opened linearly.

The biaxial stretching system is roughly divided into a tenter system (also termed a flat system) and a tube system. Which of the tenter system and the tube system is to be used is determined in view of the type of the plastic film used and the application. The tenter system is more costly than the tube system because it requires a large-sized tenter, while the tube system is more favorable in yield since selveges, that is waste from the plastic film ends, are produced in the tenter system. As for characteristics of the plastic film, it is said that the tenter system is more favorable in stretching uniformity and insusceptibility to creases, while the tube system is more favorable in uniformity of molecular orientation. In general, the tenter system is used for a variety of polyamide resin films, polyethylene terephthalate resin film, polyethylene-2,6-naphthalate resin film, polybutylene terephthalate resin film and polypropylene resin film, while both the tenter system and the tube system are used for the polystyrene resin films, vinyl chloride resin films and a variety of polyethylene resin films and the tube system is used for the vinylidene chloride resin films.

Tenter system (flat system): the sequential biaxial stretching system of the tenter system is shown schematically in FIG. 17. The molten polymer extruded from a die slit of an extruder is cooled and solidified on a casting drum 72 so as to be then stretched longitudinally (that is, in the flowing direction) by a heating roll 74 provided between a slow driving roll 73 and a quick driving roll 75. The molten polymer then enters a tenter 76, where it is heated as both ends of the plastic film are gripped, and is stretched in the transverse direction, that is in a direction perpendicular to the flowing direction. Except the heat-shrinkable plastic film, the plastic film is held at both ends in a tenter rear chamber for heat treatment for fixing inplane orientation. For longitudinal stretching, a large number of heated freely rotatable rolls are arranged between the foremost slow driving roll 73 and the rearmost fast driving roll 75. The plastic film is passed therethrough and the rpm of the rearmost roll is raised so as to be higher than that of the foremost roll for stretching to a pre-set multiplication factor. There are also a nip roll system and a clover roll system in which a thick plastic film is preliminarily heated between plural rolls and subsequently heat-stretched at a time. The tenter is usually constructed so that an endless chain having clips set thereon is run along a rail. The tenter section is made up of a pre-heating section, a transverse stretching section and a heat-treatment section (also termed a heat-setting section). For producing a heat-shrinkable plastic film, the last heat treatment is usually not performed. With the biaxial concurrent stretching system, the ratio of the rotational speed of two sets of ribber-coated pressure rolls is suitable set in meeting with the pre-set stretching ratio and a guide tool is provided for simultaneously applying the transverse stretching to the pressure rolls. This system, however, has scarcely been used on the industrial scale.

Tube System: This system may be thought of as a development of the inflation method. Referring to FIG. 18, the molten polymer is extruded in a tubular shape from a ring die 78 of the same extrusion as that for inflation and then quenched in a cooling tank 79, with the resulting tube being then heated with infrared rays and with the inside of the tube being then inflated with air and subjected to internal pressure. Alternatively, the outside of the tube is depressurized for transverse stretching. The tension is simultaneously applied to the tube in the longitudinal direction for concurrent biaxial stretching. After stretching, the tube is folded and taken up by a nip roll 80. Alternatively, the stretched film is again heated by infrared rays and fed with compressed air for re-inflating the plastic film. The inflated film is again folded by a nip roll 80 and taken up. The stretched film is again folded by the nip roll and heat-treated with infrared rays for crystallization and stabilizing molecular orientation. The resulting product is then folded into flat state. Alternatively, the tube is cut into two to produce two stretched films. This tube system has merits over the tenter system in that waste losses at both selvedges are not produced and the equipment cost is lower than in the tenter system. There are many versions of the tube system. In particular, the cooling system has been improved in various ways. Among the different versions of the tube system, there are a cooling system such as water-cooling system or outside cooling system by a cooling tube, and a system of introducing cooling means into the inside of the film.

DESCRIPTION OF THE PREFERRED EMBODIMENTS

The plastics are a solid substance artificially formed to a useful shape from a high molecular materials, mostly synthetic resin, excluding fiber, rubber, paint, adhesives or the like. The plastics may be roughly subdivided into a thermo-setting resin obtained on three-dimensional growth of molecules to a cross-linked structure to ultimately reach the insoluble or infusible state, and a thermoplastic resin which is a collection of linear molecules including a small amount of branched structures. The thermoplastic resin is preferred as the biaxially stretched plastic film employed in the present invention.

The thermoplastic resins are enumerated by, for example, polyethylene terephthalate 'PET' resin and polyethylene naphthalate. Examples of particularly preferred resins include polyester resins, such as polyethylene 2,6 naphthalate ('PEN'), high-density homopolyethylene ('HDPE'), medium density homopolyethylene ('MDPE'), low-density homopolyethylene ('LDPE'), metallocene resin, polypropylene ('PP') resin, propylene-α olefin copolymer resin (block type or random type), polyamide ('PA') resin, polystyrene ('PS') resin, polyvinyl alcohol ('PVA') resin, polyvinyl chloride ('PVC') resin, polyvinylidene chloride ('PVDC') resin, polyacetal resin, polyethylene tetrafluoride resin, vinyl acetate resin, methacrylate resin, and ethylene copolymer resins (ethylene-vinyl acetate copolymer (EVA) resin, ethylene-propylene copolymer resin, ethylene-1-butene copolymer resin, ethylene-butadiene copolymer resins, ethylene-vinyl chloride copolymer resin, ethylene-methyl methacrylate copolymer ('EEA') resin, ethylene-acrylonitrile copolymer resin, ethylene-acrylate copolymer resin, ionomer resin (resin obtained on cross-linking the ethylene-unsaturated acid copolymer with metals, such as zinc), ethylene-α olefin copolymer ('L-LDPE') resins, ethylene-propylene-butene 1 ternary copolymer resin, an ethylene-propylene elastomer and an ethylene-vinyl alcohol ('EVOH') resin. Among these, the PET resin, PEN resin, HDPE resin, L-LDPE resin, PP resin, propylene-α olefin copolymer resin, PA resin, PS resin, PVA resin, EVOH resin, PVC resin and PVDC resin are preferred. Most preferred are the PET resin, PEN resin, PA resin, PP resin, and polypropylene-ethylene copolymer resin (block type and random type).

The following are representative examples of the commercially available biaxially stretched plastic films employing most desirable PET resins as the biaxially stretched plastic films (names of manufacturers, names of commercial articles and film thicknesses):

(I) Biaxially stretched polyethylene terephthalate (PET) resin films; polyester film 'Skyrol' of KK SKC (5 to 250 μm), and a polyester film 'Merinex' of I.C.I Japan (12 to 250 μm), a polyester film 'zuitsu polyester film' of KK ZUITSU (12 to 41 μm), a polyester film 'Diafoil' of DISFOIL HOECHIST KK (7 TO 250 μm), a polyester film 'Teijin tetron film' of TEIJIN KK (5 to 250 μm), a polyester film 'Toyobo Ester Film' of TOYOBOSEKI KK (12 to 25 μm), a polyester film 'Taiko Polyester Film' of NIMURA KAGAKU KK (12 to 50 μm), and a polyester film ('Emblet') of UNITIKA KK (12 to 25 μm).

(II) Biaxially stretched polyethylene 2, 6 naphthalate (PEN) resin film; a PEN film 'Karadex' of I.C.I. Japan (25 to 125 nm; a PEN film ('Teonex film' of TEIJIN KK (4 to 250 nm);

(III) biaxially stretched polyamide (PA, mainly nylon) resin film;

biaxially stretched nylon film 'Unilon' of IDEMITSU SEKIYU KAGAKU KK (15 μm), biaxially stretched nylon film 'Toyobo Harden Film' of TOYOBOSEKI KK (12 to 25 μm);

biaxially stretched nylon film 'Santoneel' of MITSUBISHI SEKIYU KAGAKU KK (12 to 20 μm);

biaxially stretched nylon film 'Emblem' of UNITIKA KK (15 TO 25 μm);

biaxially stretched polypropylene (PP) resin film;

biaxially stretched polypropylene film 'Silphane' (15 to 60 μm) of GUNZE KK;

biaxially stretched polypropylene film 'Diaphane' (15 to 60 μm) of SAN-EI KAGAKU KOGYO KK;

biaxially stretched polypropylene film 'santox OP' (20 to to 60 μm) by SANTOX;

biaxially stretched polypropylene film 'Zuitsu OPP Film' (13 to 100 μm) by KK ZUITSU;

biaxially stretched polypropylene film 'Tocello' (20 to 60 μm) by TOCELLO KK;

biaxially stretched polypropylene film 'Toyobo Pylen Film-OT' (15 to 110 μm) by TOYO BOSEKI KK;

biaxially stretched polypropylene film 'Taiko FD' (12 to 150 μm) by NIMURA KAGAKU KOGYO KK, and biaxially stretched polypropylene film 'Sun-Orient' (20 to 60 μm) by NIMURA KAGAKU KOGYO KK.

Among the commercial biaxially stretched plastic films, the biaxially stretched special nylon film 'Uniaslon' manufactured by IDEMITSU SEKIYU KAGAKU KOGYO KK and a polyethylene naphthalate film 'Teonex Film' by TEIJIN KK are most preferred in the present invention.

The biaxially stretched PP resin (inclusive of propylene-α-olefin copolymer resin) film is mainly manufactured by the tenter system which is classified into a sequential biaxial stretching system consisting in longitudinal stretching followed by transverse stretching and a simultaneous longitudinal and transverse stretching system. There are further a equipstretching system and a partial stretching system in which tensile strength and thermal shrinkage are balanced and are not balanced in the longitudinal and transverse directions, respectively. As compared to the non-stretched PP film, the biaxially stretched PP resin film is superior in transparency, luster, lubricity, moisture-proofness, resistance to chemicals, gas barrier properties, tenacity, tensile strength, thermal resistance and resistance against cold. The present invention also has been the first to find out beyond expectation that, if the above film is layered with the thermoplastic film layer, which is a molecular-oriented plastic film layer with the TD/MD of not less than 3 according to the present invention, with the interposition of an adhesive layer, not only the above-mentioned superior properties, but also the easy-to-open properties, that is the properties of linear opening along the flowing direction, can be assured simultaneously.

Among the stretching systems for the PS resin films are a tenter system, a radial draw system and an expander roll system. The tenter system includes a sequential biaxial stretching method and a concurrent biaxial stretching method. The sequential biaxial stretching method consists in extruding a film of a thicker thickness from an extruder at an extrusion temperature on the order of 200° C., longitudinally stretching the extruded film at a pre-set factor at a stretching temperature of 100 to 130° C., feeding the stretched film to a tenter, holding both selveges and transversely stretching the film by a pre-set factor. The concurrent biaxial stretching method consists in pulling the extruded sheet in the proceeding direction by holding both selveges in the flaccid state and stretching both lateral sides laterally for biaxial stretching. The radial draw system is a special instance of the biaxial stretching of the tube system. In this case, the soft tube extruded from a die (parison) is stretched not less than 10 times the diameter of the parison and taken up from lateral sides. The expander roll system consists in applying the sheet in the flaccid state on curved expander rolls whereby the tension is applied both longitudinally and transversely for realizing biaxial stretching. The shock-resistant polystyrene (HIPS) resin is formed into a film of a thicker thickness by mounting a T-die or a coat hanger die on a extruder. The biaxially stretched polystyrene resin film is superior in heat resistance and in cold resistance, tasteless, odorless and nontoxic while exhibiting high transparency, luster, rigidity and water-proofness.

The PET resin film or the PEN resin film is biaxially stretched mainly by the sequential biaxial stretching system of the tenter type. In the basic process, dried PET chips are extruded in the molten state from a T die and solidified on cooling by a casting drum to produce an amorphous non-oriented film which is then oriented by stretching longitudinally by a longitudinal roll stretcher, oriented transversely in the tenter and thermally set and crystallized in the tenter. The characteristics of the plastic film are determined depending on the longitudinal and transverse stretching factors, stretching temperatures and heat setting temperatures which represent basic film-forming conditions. In addition to the basic process, uniform kneading, complex extrusion, multi-stage longitudinal stretching, inline coating, longitudinal re-stretching, longitudinal and transverse relax heat treatment, surface processing and removal of static charges, have recently become possible. The biaxially stretched PET resin films and the PET resin films are superior in physical strength, such as tensile strength or Young's modulus, broader in working temperature range (−70 to 150° C.) and less liable to be changed in size with temperature or humidity and can be formed into films of thinner or thicker thicknesses with little fluctuations in thickness while films with high transparency or opacity or with outstanding surface irregularities or with only small surface irregularities can be selectively produced. In particular, the PEN resin films exhibit high rigidity and physical strength and are less susceptible to curling and hence are optimum as the biaxially stretched plastic film of the present invention. The PEN resin film can be reduced further in thickness than the PET resin film.

The biaxially stretched PVA resin film exhibits high physical strength and low elongation due to high stretching and crystallization, while being high in tenacity and less susceptible to initial deformation. It is improved in moisture-proofness and exhibits stable gas barrier properties. In addition, the biaxially stretched EVO resin film is superior in tensile strength, shock proofness, piercing strength or Young's modulus, while being superior in gas barrier properties or moisture proofness. The PA resin film is mainly biaxially stretched by the tenter system. The plastic film of a thicker thickness, extruded from an extruder, is biaxially stretched in the longitudinal and transverse directions for orientation and heat-treated under tension for crystallization and fixation of the orientation.

In view of the economy, easy-to-open characteristics and amenability to lamination, the biaxially stretched plastic film layer is of an optional thickness of 5 to 125 μm, preferably 7 to 100 μm, more preferably 10 to 70 μm and most preferably 10 to 50 μm. The PET resin film and the PEN resin film are superior in the Young's modulus and in physical strength and hence can be reduced to a thickness smaller by 10 to 40% from the above value in a manner desirable for the present invention. By setting the thickness of the biaxially stretched plastic film layer to 5 to 125 μm, hermetic sealing properties of the packaged photosensitive material can be fully assured, while the easy-to-open characteristics are not impaired. The biaxially stretched plastic film layer in the packaged photosensitive material can be of a monolayer or multi-layer structure. If the film is of a multilayer structure, it may be of a layered film structure obtained by layering plural bonding monolayer films together by an adhesive layer, or of a multilayer co-extruded film layer structure. If the film is of the multilayer structure, the film thickness of the entire biaxially stretched plastic film layer is preferably within the above-defined range. If the biaxially stretched plastic film layer is the multilayer co-extruded film layer, each layer may be of the same resin composition or of the same layer thickness or of the different resin compositions or of different layer thicknesses.

The stretching factor of the biaxially stretched plastic film layer is 1.2 to 20, preferably 1.5 to 15, more preferably 1.8 to 10 and most preferably 2 to 7, in both the flowing direction (longitudinal direction) and the direction perpendicular thereto (transverse direction). By selecting the stretching factor of the biaxially stretched plastic film layer to be 1.2 to 20 in both the flowing direction and the direction perpendicular thereto, the resulting film is superior in physical strength, such as tensile strength, Young's modulus, Gelbo test strength or impact puncture strength or in moisture proofness, while the hermetic sealing properties of the packaged photosensitive material are also assured. In addition, the packaged photosensitive material is superior in easy-to-open characteristics targeted by the present invention.

For assuring the physical strength by layering the biaxially stretched plastic film layer used in the present invention with the molecular oriented thermoplastic resin film layer having the ratio of the tear strength in the direction normal to the flowing direction (TD) to that in the flowing direction (MD) of not less than 3, and for assuring easy-to-open characteristics (linear tearing properties in the flowing direction), the biaxially stretched plastic film layer used in the present invention preferably has at least the following properties:

(i) The thickness of the biaxially stretched film layer is 5 to 125 μm, preferably 7 to 100 μm, more preferably 10 to 70 μm and most preferably 10 to 50 μm;

(ii) the tensile strength (MD) of the biaxially stretched film layer according to JIS K7127 is not less than 10 kgf/mm² (98 MPa), preferably not less than 12 kgf/cm² (117.6 MPa), more preferably not less than 15 kgf/mm² (147 MPa) and most preferably not less than 20 kgf/mm² (196 MPa), while the tensile strength (TD) thereof is not less than 10 kgf/mm² (98 MPa), preferably not less than 12 kgf/mm² (117.6 MPa), more preferably not less than 15 kgf/mm² (147 MPa) and most preferably not less than 18 kgf/mm² (176.4 MPa);

(iii) the tensile elastic modulus (MD) according to JIS K7127 is not less than 100 kgf/mm² (980 MPa), preferably not less than 120 kgf/cm² (1176 MPa), more preferably not less than 150 kgf/mm² (1470 MPa) and most preferably not less than 170 kgf/mm² (1666 MPa), while the tensile eletstic modulus (MD) thereof is not less than 80 kgf/mm² (784 MPa), preferably not less than 100 kgf/cm² (980 MPa), more preferably not less than 120 kgf/mm² (1176 MPa) and most preferably not less than 150 kgf/mm² (1470 MPa);

(iv) the tearing propagation resistance (Elemendorf)(MD) according to JIS K7128 is 3 to 40 gf/25 μm (0.03 to 0.39 N/25 μm), preferably 4 to 30 gf/25 μm (0.04 to 0.29 N/25 μm), more preferably 5 to 25 gf/25 μm (0.05 to 0.25 N/25 μm) and most preferably 6 to 20 gf/25 μm (0.06 to 0.20 N/25 μm), while the tearing propagation resistance (Elemendorf) (TD) is 3 to 40 gf/25 μm (0.03 to 0.39 N/25 μm), preferably 4 to 30 gf/25 μm (0.04 to 0.29 N/25 μm), more preferably 5 to 25 gf/25 μm (0.05 to 0.25 N/25 μm) and most preferably 6 to 20 gf/25 μm (0.06 to 0.20 N/25 μm).

Most typical of the biaxially stretched plastic films having the above characteristics include the following:

(1) biaxially stretched polyethylene terephthalate resin film;

(2) biaxially stretched polyethylene naphthalate resin film;

(3) biaxially stretched polypropylene resin film; and (4) biaxially stretched nylon resin film.

These biaxially stretched plastic films may be monolayer films or multilayer co-extruded films. Various non-stretched thermoplastic resin films, biaxially stretched polystyrene resin films or biaxially stretched vinyl chloride vinylidene chloride copolymer resin films present problems such that the characteristic ranges of the films (i) to (iv) are exceeded, the thermal contraction ratios are excessive, thermal resistance falls short, or the manufacturing cost is high. The biaxially stretched plastic films particularly desirable in the present invention are (1) to (3), while the most desirable biaxially stretched plastic films are (1) and (2) for which superior physical strength and easy-to-open characteristics may be afforded when the films are layered via an adhesive layer on the molecular-oriented thermoplastic resin film. Of these, the biaxially stretched polyethylene terephthalate resin film (1) is optimum for the present invention.

For improving moisture-proofness of the biaxially stretched plastic film, a vinylidene chloride resin layer may be applied thereto, or a metal or an inorganic material, such as silica, may be vapor-deposited thereon. According to the present invention, the aluminum vapor-deposited plastic film is particularly preferred for improving moisture-proofness, oxygen barrier characteristics and light shielding performance. The effect of vapor deposition of aluminum are shown below:

TABLE 1 aluminum(Al) deposition film thickness(Å) and transmission to moisture (g/m$^2$ · 24 hrs)

| | aluminum(Al) deposition film thickness Å | | | | |
|---|---|---|---|---|---|
| film | 0 | 200 (20 nm) | 400 (40 nm) | 600 (60 nm) | 800 (80 nm) |
| PET (12 μm) | 40.4 | 2.3 | 1.4 | 1.0 | 0.8 |
| OPP (20 μm) | 5.6 | 2.3 | 1.6 | 1.2 | 0.9 |
| Ny (15 μm) | 256.4 | 8.8 | 5.8 | 3.9 | 2.6 | method of measurement: cup method (JIS Z-O2O8 condition B)

TABLE 2 aluminum(Al) deposition film thickness(Å) and transmission to oxygen gas (cc/m$^2$ · 24 hrs · 20° C.)

| | aluminum(Al) deposition film thickness Å | | | | |
|---|---|---|---|---|---|
| film | 0 | 200 (20 nm) | 400 (40 nm) | 600 (60 nm) | 800 (80 nm) |
| PET (12 nm) | 96.0 | 2.0 | 1.0 | 0.8 | 0.8 |
| OPP (20 nm) | 1000 or more | 97.0 | 50.0 | 37.0 | 29.0 |
| Ny (15 nm) | 11.4 | 1.9 | 0.7 | 0.4 | 0.3 | method of measurement: MOCON method (same pressure method, method B of JIS K7126)

TABLE 3 aluminum(Al) deposition film thickness(Å) and light transmittance(%)

| | aluminum(Al) deposition film thickness Å | | | | |
|---|---|---|---|---|---|
| film | 0 | 200 (20 nm) | 400 (40 nm) | 600 (60 nm) | 800 (80 nm) |
| PET (12 μm) | 80 | 6 | 1 or less | 0 | 0 |
| OPP (20 μm) | 86 | 4 | 1 or less | 0 | 0 |
| Ny (15 μm) | 87 | 7 | 1 or less | 0 | 0 | measurement equipment: spectrophotometer UV-365 by SHIMAZU; overall transmittance from wavelength of 3000 Å (300 nm) to 8000 Å (800 nm)

The Al vapor-deposited plastic film has, in addition to the inherent characteristics of the plastic film, the following superior characteristics:

(1) Beautiful Metallic Luster

By vapor deposition of high-purity aluminum, beautiful metallic luster is produced. By selecting the type of the underlying film or of the undercoating or top coating materials, a mirror surface finish or malted finish may be arbitrarily produced.

(2) Gas- or Steam Shielding Properties

Since the number of pinholes is smaller than with an aluminum foil, extremely high barrier characteristics may be achieved. In packaging a photographic film, it is critical to protract the storage period of the photographic film and to prevent transmutation or moisture absorption. The packaging material employing a vacuum-deposited film is a packaging material effective to prevent transmutation of the packaged article due to moisture absorption or deterioration of the photographic performance caused by permeation of an oxygen gas. The transmittance to moisture and transmittance to an oxygen gas are shown in Tables 1 and 2, respectively.

(3) Nearly Complete Shielding of UV Rays, Visible Light and IR Rays

The color fading of the colored layers of a printing or a paint on an packaged article is promoted by UV rays, while the photographic performance of the photosensitive material, such as a photographic film, is deteriorated with light or heat. However, the light shielding properties of the vacuum deposited film are optimum for protecting the photosensitive material, such as colored layers or photographic films. The light transmission rate is shown in Table 3.

(4) Lightness in Weight and Saving in Resources

The amount of aluminum used is 1/100 to 1/200 of that of an aluminum foil thus contributing to reduction in weight and saving in resources.

(5) Amenability to Machining

The plastic film surpasses a aluminum foil in amenability to machining since its bending strength is protected by elasticity of plastics and the film is less susceptible to cracking or pinholes.

(6) Electrical Conductivity

Since the plastic film is electrically conductive, no troubles due to static charges are incurred.

(7) Possibility of Forming an Optional Vapor-Deposited Film Thickness

The vapor-deposited film thickness can be set freely according to the application.

The innermost layer of the package easy-to-open for photosensitive material is a heat-fused layer. The item demanded in heat-fusing the package is prevention of lowering of the heat-sealing strength with lapse of time, in addition to securing hermetic sealing of the package easy-to-open for photosensitive material. The photosensitive material generally has an effective period (quality assurance period) of at least one month and occasionally two years or longer. There are occasions wherein the heat-sealing strength is lowered during this period with lapse of time. The heat-sealing strength is lowered due for example to bleedout to the surface of the heat-fused layer of lubricants, antioxidants or monomers, in addition to absorption of foreign matter by static electricity or oxide surface generation due to surface oxidation.

For preventing the chronological lowering of the heat sealing strength due to bleedout of the lubricants or the like, it is desirable to have the ethylene copolymer resin and/or thermoplastic elastomer contained in the heat-fusing layer in an amount of not less than 5 wt %, preferably not less than 8 wt %, more preferably not less than 10 wt % and most preferably not less than 15 wt %. By constructing the heat-fusing layer in this manner, it becomes possible to prevent the chronological lowering of the heat-sealing strength during the effective periods (quality assurance period). It is preferred for economy and amenability to manufacture that the heat-fusing layer be used simultaneously as a layer performing the role of at least one of the thermoplastic resin film layer, a light-shielding layer and a molecular-oriented plastic film.

In the heat-fusing layer, not less than 5 wt % of the ethylene copolymer resin or the thermoplastic elastomer by itself is possible, while the sum of the amounts of both may be not less than 5 wt %. In the inner most layer of the heat-fusing layer, 0.1 to 40 wt %, preferably 0.5 to 30 wt %, more preferably 1 to 20 wt % and most preferably 2 to 10 wt % of carbon black is contained for its combined effect of preventing light fogging due to light pumping effect, static fogging due to static charges and of improving physical strength and preventing oxidation of the resin.

The thermoplastic elastomer ('TPE') means such a high-molecular material which exhibits rubber-like elasticity at ambient temperature and which becomes plasticized and moldable at elevated temperatures. Specifically, the thermoplastic elastomer has the function of restoration of distortion at ambient temperature by mainly the physical cross-linking. However, at elevated temperatures, the cross-linkage is temporarily dissolved such that the material becomes thermoplastic and can be worked quickly on a usual molding machine. On cooling, the structure having rubber-like elasticity is restored. For example, the molecular structure of a styrene-based TPE is a block copolymer (linear or star-shaped) made up of a soft segment of polybutadiene or polyisoprene and a hard segment of polystyrene. These segments are flocculated so that the components undergo micro-sized phase separation and exhibit respective characteristics. At ambient temperatures, the soft segments exhibit flexibility, while the hard segments form a frozen phase to perform the role of physical cross-linkage.

By the similar principle, TPE of a block copolymer structure consisting of various combinations of soft and hard segments is developed and put on the market. In general the TPE has a significant feature that it is not in need of a curing process by sulfur which is indispensable in rubber and which affects photographic performance of the photosensitive material. In addition, the TPE exhibits strength comparable to rubber despite absence of a reinforcement agent as in rubber and is superior in dispersibility of the light shielding material, while improving the physical strength of the thermoplastic resin such that an elastic article having a wide range of physical properties from soft rubber to an article having properties close to plastics can be obtained by varying the chemical structure of the starting material. Since the elastic material is not chemically cross-linked, it is possible to re-mold scraps. The TPE not only has superior amenability to recycling but also can be used to produce a cast film using a solvent.

The thermoplastic elastomers are of various chemical structures roughly classified into styrene, polyester, polyolefin, vinyl chloride, polyamide, crystalline 1, 2 polybutadiene, ionomer, fluorine, urea, urethane and isoprene based structures. Table 4 shows representative examples of marketed TPE.

TABLE 4

| class | hard segment | soft segment | makers | commercial name |
|---|---|---|---|---|
| styrenic TPE | PS | BR or IR | SHELL CHEMICAL | Kraton, Cariflex TR |
| | | | PHILLIPS PETROLEUM | Solprene |
| | | | ANIC, ASAHI KASEI | Europrene SOLT |
| | | | NIPPON ELASTOMER | Toughprene |
| | | | NIPPON GOSEI GOMU | solprene-T |
| | | | DENKI-KAGAKU | JsR TR |
| | | | NIPPON ZEON | Denka STR |
| | | hydrogenated BR | SHELL CHEMICAL | Kraton G |
| olefinic TPE[*1] | PE or PP | IIR or EPDM | SUMITOMO KAGAKU KOGYO | sumitomo TPE |
| | | | MITSUI SEKIYU KAGAKU KOGYO | mirastomer |
| | | | NIPPON GOSEI GOMU | JSR-thermolan |
| | | | MITSUBISHI YUKA | Yuka-thermolan |
| | | | MARSONTO(MITSUBISHI MONSANTO) | Santoprene |
| | | | NIPPON SEKIYU KAGAKU | softrex |
| vinyl chloride based TPE | crystalline PVC etc. | non-crystalline PVC | SUMITOMO BAKELITE | sumiflex |
| | | | MISTUBISHI KASEI VINYL | sunprene |
| | | | DENKA KAGAKU KOGYO | vinicon R |
| | | | SHIN-ETSU POLYMER | EZ-800 |
| | | | CHISSO | elaslit |
| | | | TOA GOSEI KAGAKU | alonslit |
| | | | E.I.DU PONT DE NEMOURS | Alcryn |
| urethanic TPE[*1] | urethanic structure | polyester or polyether | MD KASEI | perecene |
| | | | NIPPON ELASTORAN | elastoran |
| | | | NIPPON POLYURETHANE | paraprene |
| | | | DAINIPPON INK KAGAKU | pandex |
| | | | TAKEDA YAKUHIN KOGYO | takelac |
| | | | NIPPON OIL SEAL | iron rubber |
| | | | DAINICHI SEIKA KOGYO | lezamin |
| | | | MITSUI NISSO URETHANE | hi-prene |
| esteric TPE | polyester | polyether | E.I.DU PONT DE NEMOURS(TORAY DU PONT),AKZO CHEMIE(DAINIPPON INK), TOYO BOSEKI, GENERAL ELECTRIC(EPL) | Hytrel Arnitel Perupuren Lomod |
| amidic TPE | polyamide | polyether or polyester | HULS(DICEL HULS), ATOCHEM(TORAY) EMS(DAINIPPON INK KAGAKU) | Vestamid (Diamid-PAE) PEBAX, glirax A |
| other TPE | syndiotactic 1.2 BR | non-crystalline BR | NIPPON GOSEI GOMU | JSR RB |
| | trans-1.4-IR | non-crystalline IR | POLYSAR KURARAY ISOPRENE CHEMICALS | TRANS-PIP trans-polyisoprene |
| | metal carboxyete ion cluster | non-crystalline PE | E.I.DU PONT DE NEMOURS MITSUI DUPONT POLYCHEMICALS | Surlyn A hi-miran |
| | crystal polyethlene | EVA or EEA | TOYO SODA,NIPPON UNICAR, ASAHI KASEI,SUMITOMO KAGAKU, MITSUI DUPONT POLYCHEMICALS, MITSUBISHI YUKA, | |

TABLE 4-continued

| class | hard segment | soft segment | makers | commercial name |
|---|---|---|---|---|
| | crystal polyethlene | chlorinated polyethylene | SHOWA YUKA, OSAKA SODA, DOW CHEMICALS | elasurene disolax, Dow-CPE |
| | fluorine resin | fluorine rubber | DAIKIN KOGYO | diel thermo plastic |

[1] overseas makers are excluded as to olefinic and urethanic TPE.
[2] the firms in parenthesis ( ) are importing selling films.
[3] BR,IR,EPDM and IIR denote butadiene rubber,isoprene rubber,ethylene-propylene-diene ternary polymer rubber and isobutylene isoprene rubber,respectively.

In the following description, a styrene-based thermoplastic elastomer is taken as an example of the thermoplastic elastomer. The styrene-based thermoplastic elastomer is a random-, block- or graft copolymer, preferably a block copolymer, of a styrene-based monomer (hard segment) and other monomers copolymerizable with the styrene-based monomers, such as monoolefins or diolefins, and hydrogenated products of these copolymers.

The styrene-based monomers may be enumerated by, for example, styrene, α-chlorostyrene, 2,4-dichlorostyrene, p-methoxystyrene, p-methylstyrene, p-phenylstyrene, p-divinyl benzene, p-(chloromethoxy)-styrene, α-methylstyrene, o-methyl-α-methylstyrene, m-methyl-α-methylstyrene, p-methyl-α-methylstyrene and p-methoxy-α-methylstyrene. Of these, styrene is particularly preferred.

Examples of diolefins include non-conjugated dienes, such as dicyclopentadiene, 1,4-hexadiene, cyclooctadiene or methyl norbornene, and conjugated dienes, such as butadiene or isoprene. Of these, butadiene and isoprene are particularly preferred. The monoolefins may be enumerated by ethylene and α-olefins with not less than three carbon atoms, such as propylene, butene-1, hexene-1,3-methylbutene-1,4-methylpentene-1, heptene-1, octene-1 or decene-1, in addition to ethylene. Of these, ethylene and propylene are particularly preferred.

The block copolymer structure may be enumerated by a so-called ABA type in which a hard segment is coupled to each end of a soft segment, a multi-block type having a repetitive structure of two blocks and a radial block type having two radially coupled blocks. In the working temperature range, polystyrene blocks form glass-like domains dispersed with size of tens of nanometers in the segment to form physical cross-linking points by constraining the soft segment.

The above-mentioned syrene-based thermoplastic elastomers can be obtained by co-polymerizing the above monomers by any known methods, including anion living polymerization method, or radical polymerization methods, such as batch block polymerization, continuous block polymerization, suspension polymerization, continuous solution polymerization or emulsion polymerization methods. Of these polymerization methods, the anion living polymerization method is particularly preferred. For controlling the micro-structure of the diene-based polymer, an organolithium compound is generally used as an initiator.

The polymerization method is classified into a method of sequentially polymerizing two components (sequential polymerization method) and a method of the sequential polymerization method followed by a coupling reaction for coupling molecules. The radial block type is produced by the latter method employing a multi-functional coupling agent. The content in the styrene-based monomer in other monomers, such as monoolefins or diolefins, copolymerizable with the styrene-based monomer, is 1 to 12 wt %, preferably 1.5 to 10 wt % and particularly preferably 2 to 8 wt %.

If the content in the styrene-based monomer in other monomers, such as monoolefins or diolefins, copolymerizable with the styrene-based monomer, is 1 to 12 wt %, it becomes possible to prevent shortage in strength on accidental descent of a spool for a photographic film, a patrone for a photographic film, instant film unit, camera body, a cartridge for a photographic film, a magazine for a photographic film or a photographic film unit with a lens. In addition, the polymer is superior in abrasion resistance and is not subjected to rise in fogging or rise partially in sensitivity even on storage of the photosensitive material in a hermetically sealed state for a long time exceeding three months.

Examples of these styrene-based thermoplastic elastomers include a styrene-butadiene-styrene block copolymer resin, a hydrogenated product thereof, namely a styrene-ethylene-butylene-styrene block copolymer resin, a styrene-butadiene copolymer resin, a hydrogenated product thereof, namely a styrene-ethylene-butylene block copolymer resin, a styrene-isoprene copolymer resin, a hydrogenated product thereof, namely a styrene-ethylene-propylene copolymer resin, a styrene-isoprene-styrene block copolymer resin, and an hydrogenated product thereof, namely a styrene-ethylene-propylene-styrene block copolymer resin. Of these styrene-based thermoplastic elastomers, the styrene-butadiene copolymer resin and the hydrogenated product thereof are particularly preferred.

The ethylene copolymer resin may be enumerated by the above resins, of which the L-LDPE resin is most preferred. The L-LDPE (linear low density polyethylene) resin, termed a third polyethylene resin, is a resin of low cost and high strength simultaneously having the merits of the low to medium density polyethylene and high density polyethylene which meets the demand of the times, namely the energy saving and saving in resources. If the content of the polyethylene resin susceptible to molecular orientation and having the melt flow rate (MFR) of not more than 0.5 g/10 minutes and a density of not less than 0.940 g/cm$^3$ is not less than 20 wt %, the L-LDPE resin is a copolymer obtained by copolymerzing ethylene and α-olefin with 3 to 20, preferably 4 to 16 and particularly preferably 6 to 10 carbon atoms using a low to medium pressure method catalyst, preferably a Ziegler catalyst, such as titaniun tetrachloride and alkyl aluminum, most preferably a metallocene catalyst. The copolymer is a polyethylene-based resin of a structure having a straight chain with short branches.

Among α-olefins desirable in physical strength and cost are butene-1, pentene-1, octene-1, hexene-1,4-methylpentene-1, heptene-1,3-methyl-pentene-1,4,4-dimethylpentene-1, hepcene-1, nonene-1, undecene-1, dodecene-1, decene-1, tetradecene-1 and octadecene-1. Most preferred in the present invention is L-LDPE resin produced using a single-site catalyst {metallocene catalyst invented by Dr. Kaminsky (also termed single-site catalyst) such as a catalyst composed of a metal compound coordinated with cyclopentadiene ring and methyl almoxane}.

Specified examples of the marketed L-LDPE resins are as follows:

Ethylene-butene-1 copolymers: G resin and NUC-FLX (UCC Corporation), Dow-Lex (DOW-CHEMICAL), Sclair (DUPONT CANADA), Marlex (PHILLIPS), Stamilex (DSM), Sumicacene L (SUMITOMO KAGAKU), Mitsubishi-Polyethylene LL (MITSUBISHI-YUKA), Nisseki Linilex (NIPPON SEKIYU-KAGAKU), NUC Polyethylene-LL (NIPPON UNICAR), Idemitsu polyethylene-L (IDEMITSU SEKIYU-KAGAKU), Ube-Polyethylene L (UBE KOSAN), Shorex Linear (SHOWA DENKO), Nipolon L (TOSO), ethylene-hexene-1 copolymer resin: TUFLIN (UCC), TUFTHENE (NIPON UNICARO), Excelene (SUMITOMO KAGAKU), Nipolon (TOSO), ethylene-4-methyl pentene-1 copolymer resin: Ultozex (MITSUI SEKIYU-KAGAKU), ethylene-octene-1 copolymer resin: Stamilex (DSM), Dowlwex (DOW-CHEMICAL), Sclair (DUPONT CANADA), MORETEC (IDEMITSU SEKIYU KAGAKU), metallocene catalyst polyethylene; Superpolyethylene (MITSUI SEKIYU KAGAKU).

Preferred as film molded product of the above L-LDPE resins in physical strength and film moldability are those L-LDPE resins of α-olefin, prepared using the above-mentioned low to medium pressure method catalyst, preferably Ziegler catalyst, more preferably single-site catalyst, having the melt flow rate (MFR) as measured under condition E of ASTM D-1238-88, a temperature of 190° C., test load of 2.16 kgf (21.2N), of 0.1 to 10 g/10 minutes, preferably 0.5 to 8 g/10 minutes, more preferably 1.0 to 6 g/10 minutes and most preferably 1.5 to 5 g/10 minutes, density as measured by ASTM D-1505 of 0.870 to 0.939 g/cm$^3$, preferably 0.890 to 0.935 g/cm$^3$, more preferably 0.900 to 0.930 g/cm$^3$ and most preferably 0.910 to 0.925 g/cm$^3$ and with the number of carbon atoms of the α-olefin of 3 to 13, preferably 4 to 10 and particularly preferably 6 to 8, and most preferably 4 to 8.

The L-LDPE resin is superior in hot-tackiness and higher in physical strength and resistance to stress cracking (ESCR) than the LDPE resin. The L-LDPE resin of which the comonomer is hexene-1 (C6) or higher is higher than that with the monomer of butene-1 (C4) in tensile strength, ESCR, impact strength and tear strength. With increased comonomer copolymerization factor of the L-LDPE resin, the density of the polymer is lowered. The L-LDPE with the density of not higher than 0.915 g/cm$^3$, as measured by the measurement method of ASTM D-1505, is increased in flexibility, impact strength or in tear strength and, in particular, exhibits good low-temperature sealing properties. Heretofore, since the EVA resin has resistance to cold, resistance to pinholes and low-temperature sealing properties, the resin has been used frequently in high-speed filling sealers. In addition to these properties, the L-LDPE, used for a photosensitive material, has such merits that it is free of odor emitted by the vinyl acetate polymer on using the EVA resin at higher temperatures, and that aldehyde possibly affecting photographic performance is not produced on oxidation of a vinyl acetate monomer, and hence it is crucial as a substitute article for the EVA resin.

The sealing method by heat fusion is roughly classified into a method by external heating and one by internal heating. The method by external heating is enumerated by methods by heat sealing, impulse sealing or spin weld method, employing the heat of friction, a method by flame and methods by laser, infrared rays and hot jets. The methods by internal heating may be enumerated by high-frequency sealing and ultrasonic welding. Some of these sealing methods are now explained.

The heat-sealing methods: heated metal is pressed directly or via a heat-resistant film on an article and fused thereto under heat conduction. The heat sealing method may be enumerated by hot-plate sealing (bar seal), rotary roll sealing, belt sealing (band sealing) and welding cut sealing. This method is used for producing a bag or a pouch and widely applied to an automatic packaging machine, such as a transverse pillow package, a longitudinal pillow package or an overwrap package. If this bar sealing is used, the temperature distribution in the fused article is such that the temperature becomes highest on the surface. Therefore, if the fused article is a sole film, the film surface is in the fused state when the seal bar is detached. Thus the method is not suited to sealing a sole film and is usually applied to sealing a laminated film having a heat-resistant film on the surface. If the method is used for a sole film, a teflon cloth is applied to the sealing bar. There are occasions wherein a bar seal is creased due to, for example, shrinkage of the sealed film. For avoiding this, the tension is applied to the film, or transverse or lattice-shaped grooves are formed in the sealing bar surface.

The rotary roll sealing is a continuous sealing method consisting in heating one or both of the paired rotary rolls and to pass superposed films between the rolls for sealing. For effecting sufficient sealing, it is necessary to slow down the roll rotation. This film can be applied to sealing a thin film material. Belt sealing is a method of clipping a coated article between a pair of rotating metal belts and to apply heating and cooling from both sides. This method is used only rarely for a bag producing machine because of a complex mechanism. However, it is used for hermetic sealing of a pouch. By this method, the coated article is flattened before the puch opening enters the belts so that any creases can be flattened out with advantage. The weld cut sealing is a method of simultaneously weld cutting and sealing the film by a heated knife and a wire. This method enables high-speed sealing and is used for forming a sole film to a bag.

Impulse sealing system: this system is a heat fusing method consisting in pressing a nicrome ribbon against a coated film via an electrically insulating heat-resistant material and instantaneously flowing large current for heating the nicrome ribbon for effecting heat welding. Since the sealing portion is opened after cooling the ribbon, this method can be used for a film subjected to significant thermal deformation, a sole film or an externally coated film of polyvinylidene chloride, ink or varnish. This sealing method is not suited t heat fusion of a thickened laminated material because of the limited thermal capacity. There is also an impulse weld cutting system, as a modified impulse sealing system, consisting in employing a nicrome wire in place of a nicrome ribbon and applying the current for heating and sealing with simultaneous weld cutting.

High-frequency Sealing System: If a high-frequency electrical field is applied to s dielectric material, it is heated by dielectric loss. Moreover, if a magnetic field is produced by the high-frequency current near an electrically conductive material, an eddy current is produced in an electrically conductive material to evolve heat. Heating an object by exploiting heating by high-frequency electro-magnetic field is termed high-frequency dielectric heating. The former type heating is termed high-frequency dielectric heating, while the latter is termed high-frequency inductive heating. The high-frequency dielectric heating, which is sealing exploiting dielectric loss ($\epsilon \cdot \tan\delta$) which is a product of the dielectric constant $\epsilon$ and a dielectric tangent ($\tan\delta$) of plastics, is not suited for polyethylene having a low dielectric loss and used for sealing polyvinyl chloride or polyvinylidene chloride having high dielectric loss. The sealing machine may be exemplified by a high frequency welder or a high frequency sewing machine. In distinction from sealing by thermal conduction, the high-frequency dielectric sealing assures uniform heating since the heating is internal heating. This method has a merit that temperature rise occurs quickly with a rate that can be controlled arbitrarily. However, the equipment cost is high and the oscillation efficiency is as low as 50% while limitations are imposed on the shape.

The high frequency inductive heating can be applied to sealing a laminated article comprised of an electrically conductive aluminum foil and a polyethylene or polypropylene sealant. With this sealant system, the aluminum foil is heated so that the sealant of, for example, polyethylene, is heated and fused to effect sealing. With sealing by inductive hating, the sealant layer is increased in temperature more quickly than with the bar sealing system to realize sealing in a shorter time. The heating system is partially applied to sealing a cap of a vessel.

Ultrasonic sealing system: this is a method consisting in mechanically vibrating plastics at a rate of 20000 to 30000 times per second using a high-frequency vibrator, an oscillator transducing the high frequency into longitudinal vibrations and a tool hone for heat evolution and welding. This system achieves sealing in a shorter time and hence is suited to sealing a film that may be heat-contracted in a shorter time. This system is also effective for sealing a thick material which raises difficulties with the heat transmission system. This system has, however, a drawback that a gap between the sealants and the pressure applied to the article for bonding exerts a delicate influence on the sealing strength and that the device is costly.

For assuring complete light shielding performance of the package easy-to-open for photosensitive material according to the present invention, at least one of laminated films is a light-shielding plastic film layer. The light-shielding plastic film layer may be a biaxially stretched plastic film layer or a molecular-oriented thermoplastic film layer as later explained. Typical examples of the light-shielding materials admixed for the light-shielding plastic film layer are given below. One or two or more of the following light-shielding materials may be employed.

Inorganic compounds: Oxides . . . silica, diatomaceous earth, alumina, titanium oxide, iron oxide, zinc oxide, magnesium oxide, antimony oxide, barium ferrite, strontium ferrite, beryllium oxide, pumice, pumice balloon, and alumina fibers; hydroxides . . . aluminum hydroxide, magnesium hydroxide, basic magnesium carbonate; carbonates . . . calcium carbonate, magnesium carbonate, dolomite, and dorsonite; sulfates (sulfites) . . . calcium sulfate, barium sulfate, ammonium sulfate and calcium sulfite; silicates . . . talc, clay, mica, asbestos, glass fibers, glass balloon, glass beads, calcium silicate, montmorillonite, and bentonite.

Carbon . . . carbon black, graphite, carbon fibers, carbon hollow balls; others, . . . iron powders, copper powders, lead powders, tin powders, stainless steel powders, pearl pigment, aluminum powders, molybdenum sulfide, boron fibers, silicon carbide fibers, brass fibers, potassium titanate, titanic acid lead zirconate, zinc borate, barium meteborate, calcium borate, sodium borate, aluminum paste and talc. Organic compounds: wooden powders (pine, oak, sawdust), husk fibers (almond, peanuts, chaff), various colored fibers, such as cotton, jute, paper chips, cellophane chips, nylon fibers, polypropylene fibers, starch, aromatic polyamide fibers.

Of the light shielding materials, the pigments having the mean particle size, as measured by an electronic microscopic method, hereinafter the same, of 5 to 10000 nm, preferably 9 to 5000 nm, more preferably 13 to 2000 nm and most preferably 15 to 1000 nm, the refractive index, as measured by Larsen oil immersion method, hereinafter the same, of not less than 1.45, preferably not less than 1.5, more preferably not less than 1.55 and most preferably not less than 1.6 and the DBP oil absorption as measured by the oil absorption amount A method of JIS K6221, hereinafter the same, of 10 to 800 ml/100 g, preferably 15 to 600 ml/100 g, more preferably 20 to 400 ml/100 g, and most preferably 25 to 200 ml/100 g, are most preferred.

The pigments satisfying the above characteristic values exhibit good dispersibility for the thermoplastic resin compositions, superior light shielding performance, light shielding properties of the package easy-to-open for photosensitive material, physical strength, hermetic sealing properties and moldability without affecting the photographic performance of the photosensitive materials. Of these pigments, carbon black is most preferred, since it can decrease the bleedout amount of the lubricants or antioxidants, is inexpensive, superior in light shielding performance and is not likely to affect the photographic performance of the photosensitive material.

The methods for producing the carbon black may be classified into the furnace carbon black, channel carbon black, thermal carbon black and acetylene carbon black, any of which may be employed. Of these, furnace carbon black is most preferred in that it is less susceptible to adverse photographic effects, such as fogging, decreased or increased photosensitivity while improving the light shielding properties.

The characteristics of carbon black include mean particle size (electronic microscopic method) of 5 to 350 nm, preferably 9 to 250 nm, more preferably 13 to 150 nm and most preferably 15 to 70 nm. The DBP oil absorption amount (JIS K6221 oil absorption amount A method) of 10 to 350 ml/100 g, preferably 20 to 250 ml/100 g, more prefrably 30 to 200 ml/100 g, and most preferably 40 to 150 ml/100 g. The refractive index (Larsen's oil immersion method) is not less than 1.45, preferably not less than 1.5, more preferably not less than 1.55 and most preferably not less than 1.6.

If the particle size of the carbon black is 5 to 350 nm, the DBP oil absorption amount is 10 to 350 ml/100 g and the refractive index is not less than 1.45, the carbon black is superior in dispersibility for the thermoplastic resin composition, light shielding performance, light shielding properties for the package easy-to-open for photosensitive material, physical strength, hermetic sealing or moldability without affecting the photographic performance of the photosensitive material. For further lowering the adverse effects on the photographic performance of the photosensitive material, it is desirable that the sulfur content in the carbon black as measured by the ASTM D-1619 measurement method, hereinafter the same, be not higher than 1.0 wt %, preferably not higher than 0.8 wt %, more preferably not higher than 0.6 wt %, and most preferably not higher than 0.4 wt %.

The cyan compound content as measured by the 4-pyridine carboxylic acid pyrazolone light absorption analysis method is not more than 0.01 wt %, preferably not more than 0.05 wt %, more preferably not more than 0.005 wt % and most preferably not more than 0.001 wt %. The aldehyde compound content as measured by the iodine method is not more than 0.5 wt %, preferably not more than 0.1 wt %, more preferably not more than 0.05 wt % and most preferably not more than 0.01 wt %.

Attention should be exercised since these substances, if present only in a minor amount, affect photographic performance of the photosensitive material. It is possible to add hydantoin or hydantoin compounds for preventing adverse effects on the photographic properties of the photosensitive materials (which render formaldehyde non-toxic) by reaction with or adsorption on these substances or urea compounds (which renders formaldehyde non-toxic) or to add a deodorant, synthesized hydrotalcite compounds or mixtures of synthesized hydrotalcite compounds with synthetic zeolite in an amount of 0.001 to 20 wt %, preferably 0.005 to 15 wt % and more preferably 0.01 to 10 wt %, depending on the objective.

The content of the light shielding materials, such as carbon black, to the respective layers of the package in the package easy-to-open for photosensitive material, is generally 0.05 to 40 wt %, preferably 0.1 to 35 wt %, more preferably 0.15 to 30 wt % and most preferably 0.2 to 25 wt %, depending on the type or thickness of the packaged material, in view of complete light shielding properties, moldability or physical strength. If the amount of addition of the light shielding materials, such as carbon black, is 0.05 to 40 wt %, the package easy-to-open for photosensitive material is improved in hermetic sealing properties, light shielding properties, anti-static properties, physical strength, moldability or appearance, while being not deteriorated in openability. It should however be noted that the addition amount is varied with the type or the sort of the packaging material.

Examples of preferred marketed goods of carbon black include acetylene black produced by DENKI KAGAKU KK (Denkablack), carbon black #20(B), #30(B), #33(B), #40 (B), #41(B), #44(B), #45(B), #50, #55, #100, #600, #950, #1000, #2200(B), #2400(B), MA8, MA11, MA100 by MITSUBISHI KASEI KK, Showblack N134, N110, N220, N234, N219, N339, N330, N326, N330T, N351, MAF, N550 and SRF by SHOWA CABBOT KK.

Examples of overseas products include Black Pearls 2, 46, 70, 71, 74, 80, 81 and 607, Regal 300, 330, 400, 660, 991 and SRF-S and Vulcan 3, 6, Sterling 10, SO, V, S, FT-FF and MT-FF by CABBOT INC.

Other examples include United R, BB, 15, 102, 3001, 3004, 3006, 3007, 3008, 3009, 3011, 3012, XC-3016, XC-3017 and 3020 by ASHALND CHEMICLS INC. The above examples are merely illustrative and any other produces conforming to the objective without affecting photographic properties of the photosensitive material may be used in the present invention if the products used are not objectionable for economics, physical strength or appearance.

Dispersants may also be added for improving dispersibility of the light shielding properties. The dispersants may be classified into those dissociating and dispersing the light shielding materials for improving its dispersion properties, and those coating the surface and preventing cohesion of the light shielding materials. Examples of the former type dispersant include pigments having the properties of improving dispersibility of the light shielding material (referred to hereinafter as 'dispersing pigments' and lubricants such as metal salts of fatty acids, fatty acids and esters of fatty acids. Examples of the latter type dispersant include metal salts of fatty acids and surface coating material, such as coupling agents.

In general, the light shielding material is liable to cohesion. If the light shielding material is mixed and kneaded with the dispersion pigments, the particles of the cohering light shielding material is dissociated and dispersed to improve dispersibility of the light shielding material in the packaged photosensitive material without affecting the photographic performance of the photosensitive material. If two or more light shielding materials having different Mohs hardness values, that having the higher value of the Mohs hardness is the dispersion pigment. Specifically, the dispersion pigment preferably has the Mohs hardness not less than 1.5 times that of the light shielding material. It is most preferred for the dispersion pigment to have the Mohs hardness not lower than twice and preferably thrice that of the light shielding material.

By the Mohs hardness of the dispersion pigment being not less than 1.5 times that of the light shielding material, the dispersion pigment can be dissociated and dispersed sufficiently in the light shielding material at the time of kneading. If the Mohs hardness of the dispersion pigment is less than 1.5 times that of the light shielding material, the effect of sufficiently dispersing the light shielding material cannot be achieved. The content of the dispersion pigment is an optional value which is $1/100$ to $2/3$, preferably $1/50$ to $1/2$, more preferably $1/40$ to $1/3$ and most preferably $1/30$ to $1/4$. By the content of the dispersion pigment being $1/100$ to $2/3$ times that of the light shielding material, it becomes possible to prevent the photosensitive material from becoming grazed or subjected to frictional fogging by the dispersion pigment having high Mohs hardness and to disperse the light shielding material effectively. The Mohs hardness and the refractive index of illustrative light shielding materials are shown below (the light shielding material becomes the dispersion pigment if it has the moh's hardness higher than that of the other light shielding materials). It should be noted that these specified values do not limit the present invention.

The white pigments may be enumerated by titanium oxide ($TiO_2$, inclusive of both anatase type and rutile type; Mohs hardness, 5.5 to 7.0; refractive index, 2.5 to 2.8), zinc flower (ZnO, Mohs harness, 4.5; refractive index, 2.0), lead white (PbO, refractive index, 2.1); lithophone ($ZnS+BaSO_4$, Mohs hardness, 4.5; refractive index, 1.8), alumina (Mohs hardness, 3 to 3.5; refractive index, 1.7), magnesite (Mohs hardness, 4.5; refractive index, 1.62), calcium carbonate ($CaCO_3$, Mohs hardness, 3 to 3.5; refractive index, 1.6), talc (Mohs hardness, 1.0; refractive index, 1.6), calcium sulfate ($CaSO_4$, Mohs hardness, 2.0; refractive index, 1.6), dolomite (Mohs hardness, 3.8; refractive index, 1.6), mica (Mohs hardness, 1.5 to 1.6), aluminum hydroxide (refractive index, 1.5 to 1.6) and silica (Mohs hardness, 5.0; refractive index, 1.45).

Of these white pigments, dolomite, lithophone, zinc flower, calcium carbonate, alumina and magnesite, having the Moh's hardness of not lower than 3 and the refractive index of not lower than 1.6 are preferred as the dispersion pigment in view of improving the dispersibility of the light shielding materials and in view of improving the light shielding performance. Preferred are zinc flower and titanium oxides having the Mohs hardness of not lower than 4.5 and the refractive index of not lower than 2.0. Most preferred is titanium oxide having the Mohs hardness of 5.5 to 7.0 and the refractive index of not lower than 2.5. The reason is that the higher the refractive index, the more is the light scattered by the white pigments, and hence the larger is the light shielding capability.

The mean particle size of titanium oxide is 10 to 1500 nm, preferably 40 to 1000 nm, more preferably 100 to 600 nm and most preferably 150 to 400 nm. The dispersion pigment with the mean particle size of 10 to 1500 nm is optimum since it does not affect photographic performance of the photosensitive material, is inexpensive, less liable to cohesion and is effective in dispersing the light shielding material. In addition, titanium oxide itself is capable of scattering the visible light and improving the light shielding capability. Also, calcium carbonate, barium sulfate and aluminum hydroxide are inexpensive and less likely to affect the photographic performance of the photosensitive material, while being effective to improve fluidity of the packaged photosensitive material and dispersing the light shielding materials.

Examples of colored pigments include carbon black (Mohs hardness, 2.0; refractive index, 1.62), iron black ($Fe_3O_4$) and iron oxide red ($Fe_2O_3$, red pigment). Of the above light shielding materials, carbon black is most preferred because it has a large light shielding performance and a small Mohs hardness and is inexpensive. The iron black has a hardness approximately equal to 6.0. although it is varied from one production method to another. The iron black is most desirable since it is highly effective in dissociating and dispersing the light shielding materials with lower Mohs hardness, such as carbon black, for improving the light shielding capability, and in raising the coloration density of the packaging material for improving the light shielding performance, since the iron black itself is black pigment. The Mohs hardness of the iron oxide red is also changed from one production method to another, however, it is approximately 6.5, so that the iron oxide red is effective to disperse and scatter the light shielding material with smaller Mohs hardness such as carbon black for improving the light shielding performance.

As described above, the light shielding material can be improved in dispersibility by being mixed and kneaded with the dispersion pigment. In addition, if the light shielding material is used in conjunction with a surface coating material, the light shielding material may be further improved in dispersibility. The surface coating material for the light shielding material may be enumerated by metal salts of fatty acids, azide silanes (disclosed in JP Patent Kokai JP-A-62-3125), silane yarn (such as amino silane), coupling agents, such as titanate, surfactants, such as oxyethylene dodecylamine, a composition composed only of metal oxide hydrates (one or more of hydrate oxides of titanium, aluminum, cerium, zinc, iron, cobalt or silicon), and/or metal oxides (one or more oxides of titanium, aluminum, cerium, zinc, iron, cobalt or silicon), cerium cations, selected acid anion and alumina, alkoxy titanium derivatives having α-hydroxy carboxylate residues in a substituent, polytetrafluoroethylene, polydimethyl siloxane or modified silicon, phosphoric acid ester compounds, 2 to 4-valent alcohols, olefin wax (such as polyethylene wax or polypropylene wax), silica or zinc compounds (zinc chloride, zinc hydroxide, zinc oxide, zinc sulfate, zinc acetate and zinc citrate) and polyhydroxy saturated hydrocarbons. Of these, metal salts of fatty acids are most preferred as surface coating material in point of improving dispersibility of the light shielding materials, prevention of the lowering of the physical strength of the packaged photosensitive material, improving moldability and compatibility and improving the photographic performance of the photosensitive material.

The surface coating material containing metal salts of fatty acids can coat the surface of the light shielding material and/or the dispersion pigment, prevent cohesion of the light shielding material and suppress moisture absorption of the light shielding material. In addition, by using the surface coating material containing metal salts of fatty acids, such effects as prevention of micro-grids producing frictional fogging, pressure fogging, or grazing in the photosensitive material in case of the photosensitive material for photography which is the most technically advanced and crucial product among the photosensitive materials.

Among the fatty acids making up the metal salts of fatty acids are fatty acids having an optional number of carbon atoms ranging from 6 to 50 and preferably from 10 to 40. Alternatively, the fatty acids may also be a mixture of various fatty acids having the number of carbon atoms ranging from 6 to 50. The metals making up the metal salts of the fatty acids may be selected from the group consisting of calcium, zinc, cobalt, manganese, tin, lead, aluminum, magnesium, sodium, barium and cadmium. The surface coating material containing these metal salts of fatty acids is highly effective in improving dispersibility of the light shielding materials and photographic performance.

The content of the metal salts of the fatty acids in the light shielding plastic film layer constituting the package for the package easy-to-open for photosensitive material is 0.01 to 5 wt %, preferably 0.03 to 4 wt %, more preferably 0.05 to 3 wt % and most preferably 0.07 to 2 wt %. The content of the metal salts of fatty acids in a range from 0.01 to 5 wt % is effective in improving dispersibility of the light shielding material while not affecting the photographic performance of the photosensitive material.

Typical examples of the metal salts of fatty acids include calcium stearate, zinc stearate, magnesium stearate, sodium stearate, calcium oleate, calcium palmitate, sodium palmitate, calcium laurate, calcium ricinoleate, zinc ricinoleate, zinc laurate and zinc 2-ethyl hexonate.

At least one of layers, excluding biaxially stretched plastic film layers, of the package for the package easy-to-open for photosensitive material of the present invention, is a plastic film layer molecular-orinted in the flow direction (longitudinal direction), having a TD/MD of not less than 3, preferably not less than 4, more preferably not less than 5 and most preferably not less than 10. By the molecular orientation is meant linear molecules being arrayed in a pre-set direction. Although the thermoplastic resin is generally formed by linear macromolecules, these molecules are present in many cases in the flexed form and partially entwined with one another, while only small portions are arrayed in regular order to form a crystalline structure. In general, if macromolecules are worked by a film molding technique, the molecules tend to be stretched in the flowing direction (longitudinal direction) to assume a molecular orientation when the molecules pass through a narrow space under a strong pressure for molding. The molecular-oriented plastic film layer is markedly improved in tensile strength along the flow direction (longitudinal direction) and hence in tensile strength. However, it is lowered in tear strength and becomes liable to be torn. Therefore, by having a plastic film layer that is molecular-oriented in the flow direction (longitudinal direction), that is, that has a high TD/MD ratio, the packaged photosensitive material is significantly lowered in tensile strength in the flow direction (longitudinal direction) as compared to the direction normal to the flow direction (transverse direction) thus assuring easy-to-open characteristics of the packaged photosensitive material, that is ease in opening in a linear direction relative to the flow direction.

Meanwhile, the plastic film layer may be molecular-oriented in a uniaxial direction by uniaxially stretching the plastic film layer. The method for uniaxial stretching is classified into a wet stretching method and a dry stretching method. The dry stretching method is further classified into a radiation heating type method, hot air heating type method, hot plate heating type method and a roll (drum) heating type method. The uniaxial stretching method occasionally uses a system consisting in the combination of these methods.

The wet stretching method is such a method in which stretching is carried out in a vessel of heated water. This method has a merit that the entire film is heated uniformly and the cost is low. However, the method also has a drawback that, since the water temperature is not higher than 100° C., the actual film temperature is approximately 80° C. so that a high stretching ratio cannot be achieved, while water is deposited on the film to render drying necessary. Consequently, a method of adding ethylene glycol or polyethylene glycol for raising the water temperature or a method consisting in combination of the wet type stretching and roll stretching is employed.

The radiation heating method is a method of heating using an IR heater. With this method, higher temperatures can be realized easily, while local heating is also realized easily. The hot air heating method or the hot plate heating method is such a method in which hot air circulation or a heated plate is used for heating and stretching the film. The roll heating method is a method of using a heated roll for stretching a film.

For achieving molecular orientation of the plastic film layer at a low cost, a special resin composition may be molded into a film by an inflation (ring die) film molding method or a T-die (cast) film molding method without the necessity of uniaxially stretching the plastic layer. For example, a homopolyethylene resin, an ethylene copolymer resin or a polypropylene resin of specified characteristics is used for providing a molecular oriented film. Representative examples of the special resin compositions are given below. However, the present invention is not limited to these examples. That is, if the thermoplastic resin film layer molecular-oriented in the flowing direction has a ratio of the tear strength in the direction normal to the flow direction, that is in the transverse direction to that in the flow direction (longitudinal direction) of not less than 3, such film layer may be used in the present invention as the molecular-oriented thermoplastic resin film layer layered on the biaxially stretched plastic film layer.

(1) An ethylene-based resin composition is used, which is comprised of 5 to 90 parts by weight, preferably 10 to 80 parts by weight, more preferably 20 to 70 parts by weight and most preferably 30 to 60 parts by weight of the L-LDPE resin and 10 to 95 parts by weight, preferably 20 to 90 parts by weight, more preferably 30 to 80 parts by weight and most preferably 40 to 70 parts by weight of high-density homopolyethylene resin and/or L-LDPE resin. The former L-LDPE resin has an MFR of 0.1 to 10 g/10 minutes, preferably 0.2 to 8 g/10 minutes, more preferably 0.5 to 6 g/10 minutes, and most preferably 1 to 5 g/10 minutes, and a density of 0.870 to 0.939 g/cm$^3$. The latter resin has an MFR of 0.01 to 1.5 g/10 minutes, preferably 0.02 to 1.0 g/10 minutes, more preferably 0.03 to 0.8 g/10 minutes, and most preferably 0.04 to 0.5 g/10 minutes, and a density of 0.940 to 0.985 g/cm$^3$.

(2) An ethylene-based resin composition is used, which is comprised of 5 to 90 parts by weight, preferably 20 to 80 parts by weight, more preferably 35 to 70 parts by weight and most preferably 45 to 60 parts by weight of the L-LDPE resin and 10 to 95 parts by weight, preferably 20 to 80 parts by weight, more preferably 30 to 65 parts by weight and most preferably 40 to 55 parts by weight of high-density homopolyethylene resin and/or L-LDPE resin. The former L-LDPE resin has an MFR of 0.5 to 10 g/10 minutes, a density of 0.905 to 0.939 g/cm$^3$, and a Q-value (Mw/Mn) of not more than 15, while the latter resin has an MFR of 0.01 to 0.9 g/10 minutes and a density of 0.940 to 0.985 g/cm$^3$.

(3) If it is desired to provide a packaged photosensitive material which, by layering on both sides of a biaxially stretched plastic film layer via an adhesive layer to a peeling strength of not less than 400 g/15 mm width, has superior easy-to-open characteristics, especially linear tearing performance, substantially zero curling, superior amenability to manufacture of the packaged material of FIG. 14, and which is not susceptible to peeling of the heat sealing performance or breakage of the bag during packaging or transport, which has not been possible to realize with the monofilm layer having the tear strength in the direction normal to the flow direction (transverse direction) to the tear strength in the flow direction (longitudinal direction) ratio of not less than 5, an ethylene-based resin composition is used, which is comprised of 30 to 90 parts by weight, preferably 40 to 80 parts by weight, more preferably 45 to 70 parts by weight and most preferably 50 to 65 parts by weight of the L-LDPE resin [A], 10 to 70 parts by weight, preferably 20 to 60 parts by weight, more preferably 30 to 55 parts by weight and most preferably 35 to 50 parts by weight of high-density homopolyethylene resin and/or L-LDPE resin [B] and 0.1 to 40 parts by weight, preferably 0.5 to 30 parts by weight, more preferably 1 to 20 parts by weight and most preferably 2 to 10 parts by weight of a light-shielding substance [C]. The first resin, that is L-LDPE resin, has an MFR value of 0.1 to 10 g/10 minutes and preferably 0.5 to 5 g/10 minutes and a density of 0.905 to 0.939 g/cm$^3$ and preferably 0.910 to 0.935 g/cm$^3$ and a Q-value (Mw/Mn) of not more than 15 and preferably not more than 10. The second resin has an MFR value of 0.01 to 0.5 g/10 minutes and preferably 0.03 to 0.3 g/10 minutes an a density of 0.940 to 0.985 g/cm$^3$ and preferably 0.945 to 0.965 g/cm$^3$ and a Q-value (Mw/Mn) of not less than 16, preferably 20 to 50, and more preferably 22 to 40. The sum of the ingredients [A] and [B] is 100 parts by weight.

(4) In (3), the most preferred embodiment is explained.

That is, an ethylene-based resin composition is used, which is comprised of 45 to 70 parts by weight and preferably 50 to 65 parts by weight of an ethylene-butene-1 copolymer resin [A], 30 to 55 parts by weight and preferably 35 to 50 parts by weight of a high-density polyethylene resin [B], inclusive of an ethylene-α-olefin copolymer resin with an α-olefin content with not less than 3 carbon atoms of not more than 10 mol %, 0.5 to 10 parts by weight and preferably 1 to 7 parts by weight of a light-shielding material [C] and 0.001 to 10 wt % and preferably 0.005 to 7 wt % of at least one selected from an anti-oxidant and/or lubricant and/or hydrotalcites [D]. The first resin [A] has an MFR of 0.1 to 5 g/10 minutes, preferably 0.5 to 3 g/10 minutes, a density of 0.905 to 0.939 g/cm$^3$ and preferably 0.910 to 0.930 g/cm$_3$, a Q-value (Mw/Mn) of not more than 15 and preferably not more than 10. The second resin [B] has an MFR of 0.01 to 0.3 g/10 minutes, preferably 0.03 to 0.15 g/10 minutes, a density of 0.940 to 0.970 g/cm$^3$ and preferably 0.940 to 0.960 g/cm$^3$, a Q-value (Mw/Mn) of not less than 20, preferably 22 to 40 and more preferably 24 to 38. The sum of the ingredients [A] and [B] is 100 parts by weight.

(5) Representative examples of a marketed low to mid pressure high-density polyethylene resin having an MER of 0.03 to 0.3 g/10 minutes and a Q-value (Mw/Mn) of 24 to 38, and which is most preferably added for producing a plastic film molecular-oriented in the flow direction in the present invention (longitudinal direction), are given below in the order of the makers, brands, MFR values, density and Q-value=Mw/Mn:

NIPPON SEKIYU KAGAKU KK, Nisseki Staflene E905 (F) (MFR 0.05 g/10 minutes, density 0.946 g/cm$^3$, Q-value 36).

MITSUI SEKIYU KAGAKU KK, Hi-Zex 7000F (MFR 0.05 g/10 minutes, density 0.956 g/cm$^3$, Q-value 25).

MITSUI SEKIYU KAGAKU KK, Hi-Zex 8000F (MFR 0.03 g/10 minutes, density 0.950 g/cm$^3$, Q-value 36).

IDEMITSU SEKIYU KAGAKU KK, Idemitsu Polyethylene 640UF, (MFR 0.05 g/10 minutes, density 0.955 g/cm$^3$, Q-value 25).

If a resin composition containing not lees than 20 wt % of these resins and 0.01 to 5 wt % of the lubricant (especially, metal salts of fatty acids are preferred) is molded into an inflation film with a blow-up ratio of not less than 1.2 and preferably not less than 1.5, a plastic film may be produced which is superior in physical strength and easy-to-open characteristics and that is molecular-oriented in the flow direction (longitudinal direction).

The Q-value is a measure representing the molecular weight distribution and is measured by finding a molecular weight distribution curve by gel permeation chromatography and by calculating a weight average molecular weight (Mw) and a number average molecular weight (Mm) by the universal calibration method with the single-distributed polystyrene resin of known molecular weight as a reference. That is, the Q-value according to the present invention is found by:

Q value=weight average molecular weight (Mw)/number average molecular weight (Mn). If the MFR (condition E of ASTMD 1238) of the L-LDPE resin, preferably used in the molecular-oriented thermoplastic resin film layer of the present invention, is less than 0.1 g/10 minutes, and if the Q-value is not more than 15, the resin becomes poor in fluidity and film-molding properties, thus giving rise to melt fracture or defects in appearance, such as fishskin or micro-grids or to pinholes. On the other hand, if the MFR of the L-LDPE resin exceeds 10 g/10 minutes, the resin is improved in fluidity, however, it becomes poor in elongation or tension on fusion and in film moldability. Moreover, the produced film becomes inferior in film tear strength, impact puncture strength or heat-sealing strength. A molecular-oriented thermoplastic resin film layer, which uses an ethylene-based resin composition obtained on blending the L-LDPE resin or the high-density polyethylene resin with the density of not less than 0.940 g/cm$^3$ susceptible to molecular orientation for improving the easy-to-open characteristics, cannot be used for the package of the present invention which assures complete light shielding properties and complete tight sealing. If the density (ASTMD 1505) of the L-LDPE resin is less than 0.870 g/cm$^3$, the resin pellet becomes sticky and liable to blocking in a hopper. In addition, motor load of the extruder is increased to lower the film moldability significantly to render practical use impossible. If the density of the L-LDPE resin exceeds 0.939 g/cm$^3$, molecular orientation is facilitated such that the produced film is inferior in tear strength and impact puncture strength.

If the high-density homopolyethylene resin and/or L-LDPE resin, most preferably used for affording easy-to-open characteristics (linear tearability) of the molecular-oriented thermoplastic resin film according to the present invention, with the density of not less than 0.940 g/cm$^3$ has an MFR of less than 0.01 g/10 minutes, the resin becomes poor in fluidity and high in viscosity on melting thus producing melt fracture and giving rise to defects in appearance, such as fishskin or knurls or occasionally to pinholes.

On the other hand, if MFR exceeds 1.5 g/10 minutes, the resin is improved in fluidity. However, it becomes poor in easy-to-open characteristics and in elongation or tension on melting thus worsening film moldability. Moreover, the produced film becomes poor in physical strength thus disabling utilization. If the density of the high-density polyethylene resin is not less than 0.940 g/cm$^3$ and/or the L-LDPE resin is less than 0.940 g/cm$^3$, rigidity on melting becomes small to lower moldability, tear strength, impact puncture strength or tensile strength. In particular, the easy-to-open characteristics (linear tearability) is lowered. On the other hand, if the density exceeds 0.985 g/cm$^3$, the film moldability is lowered, while the cost is high because of difficulties in polymerization. In addition, the produced film becomes poor in amenability to heat-sealing.

The tear strength in the flow direction (longitudinal direction) of the package in the package easy-to-open for photosensitive material (Elemendorf tear strength as measured by the method shown in JIS Z1702) is 4 to 600 g, preferably 8 to 300 g, more preferably 10 to 150 g and most preferably 15 to 100 g. The smaller the above value, the better is the tearing workability. In addition, the tearing direction becomes linear and parallel to the flow direction. The thickness of the plastic film layer molecular-oriented in the flow direction (longitudinal direction) is 10 to 120 $\mu$m, preferably 13 to 105 $\mu$m and particularly preferably 15 to 90 $\mu$m. By setting the thickness of the plastic film layer molecular-oriented in the flow direction (longitudinal direction) to 10 to 120 $\mu$m, the plastic film layer molecular-oriented in the flow direction (longitudinal direction) may be prevented from becoming creased during manufacture, while the easy-to-open characteristics of the packaged photosensitive material can be assured while assuring the physical strength.

The plastic film layer, molecular-oriented in the above-described flow direction in the packaged photosensitive material, may be a monolayer or multiple layers. If the plastic film layer is of multiple layers, the film layers may be a layered film made up of plural monolayer films, or may be a multi-layer co-extruded film layer. If the plastic film layer is of multiple layers, the entire film thickness, that is the plastic film thickness molecular-oriented in the flow direction, is preferably within the above range. If the plastic film layer molecular-oriented in the flow direction is a multi-layer co-extruded film layer, each layer may be of the same resin composition and of the same film thickness, or of the different resin compositions and of the different film thicknesses.

The above-mentioned biaxially stretched plastic film layer, light-shielding plastic film layer, the plastic film layer molecular-oriented in the flow direction, heat-fusion layer and the flexible sheet layer are layered together with or without interposition of adhesive layers to form a laminated film which is used for preparing the package in the package easy-to-open for photosensitive material or the packaged photosensitive material using them.

The package in the package easy-to-open for photosensitive material as a packaging bag, according to the present invention, may be enumerated by a single layer flat bag, a double layer flat bag, a three or more layer flat bag, square bottom bag, a self-upstanding bag, a single layer gazette bag (bag whose product takeout opening and insertion opening are hermetically sealed by folding tape or the like), a double-layer gazette bag, a three or more layer gazette bag, a double-side heat-sealing flat bag or gazette bag, a three-sided heat-sealing flat bag or gazette bag, or a gazette bag.

The package for the package easy-to-open for photosensitive material employing a laminated film sheet may be enumerated by a bulk roll packaged material, or a roll-shaped packaged photosensitive material disclosed in e.g., JP Patent Kokai JP-A-7-257510 or in JP Patent Kokai JP-A-6-214350. The package for the photographable packaged film may be exemplified by a package easy-to-open for photosensitive material as a packaging bag for hermetically sealing and light-shielding the film unit with a lens disclosed in e.g., JP Patent Kokoku JP-B-7-1380, JP Patent Kokoku JP-B-7-50747 and JP Utility Model Kokoku JP-B-5-2919, whose properties are deteriorated by light or moisture, such as a developing solution, fixing solution or a dye.

The double-sided bag is a tubular film the upper and lower (top and bottom) ends of which are sealed together. The three-sided sealing bag is a one-piece flat film folded and both ends and the top except the folded side are sealed together. A pillow-shaped three-sided seal bag is a pillow-shaped film the jointed center portion and upper and lower sides of which are sealed together. The center seals include jointed seals, envelop seals and tape seals. The jointed seals are most popular seals. However, the sealed portions of the center seal and the upper and lower seals are susceptible to sealing troubles. The reason is that the sealing layers of the intersections are doubled in number resulting in the shortage in the heat and pressure application for sealing the double layer and four layer portions and in non-uniformities. The envelope seal is not the seal of the same surfaces, as in the case of the jointed seals, but is the seal between different surfaces, such as front and back sides, so that films having sealing performance which is the same on the front side and on the back surface or the double-side seal strip for sealing may be produced.

This seal is characterized by (i) three sealing layers of the (longitudinal and transverse) intersections and by less frequent occurrence of sealing troubles than the jointed seal, (ii) higher sealing strength under the same conditions, and (iii) by the film area required for center sealing being ½. The tape seal is used for increasing the sealing strength and used for sealing the jointed film ends by a seal strip. With this seal, seal destruction is shearing destruction. Although the sealing strength is high and stable, the production cost is increased.

The four-sided seal seals the four sides. This seal is superior in general in appearance and used for small-capacity packaging. Since the four sides are sealed, a seal opening end can be provided easily. The double-side sealed tubular film is produced by inflation film forming, or tubular film forming methods. The general-purpose film is a monolayer film, however, a multi-layered film by multilayer co-extrusion is becoming widespread with diversification and with a demand for higher quality. The synthetic high molecular material mainly used in a monolayer film, mainly thermoplastic resins, is enumerated by LDPE resins, L-LDPE resins, MDPE resins, HDPE resins, EVA resins, PP resins, PVC resins, PVDC resins and PVA resins. In addition to these resins, nylon-6, nylon 6·6, PET, PEN and EVOH resins. A variety of 2 to 5-layered multi-layer co-extruded tubular films are being developed. The double-sided bags have such merits that generally the sealing length of the bag is short such that there is only little risk of breakage initiated at the seal.

The material used for a three-sided seal bag is a planar film which is folded to a required shape and molded so as to be then sealed at three sides by a suitable method. The bag is mainly produced by a heat-sealing plastic film. For jointed seal and envelop seal, a single-sided heat-sealing plastic film and a double-sided heat-sealing plastic film are used, respectively. The bag shape is classified into a flat bag and a pillow-shaped bag.

A flat bag is similar in shape to 'kamasu-bag' formed of straw mat and used from olden times for holding salt or coal. It is also termed 'kamasu-shaped bag'. This bag as a packaging inner capacity ($cm^3$)/packaging film surface ($cm^2$) ratio smaller than that of the pillow-shaped bag and hence slightly inferior in packaging efficiency. It is frequently used for packaging small quantities. For molding, bag forming, charging of the contents and for heat melting of the flat bag, a horizontally moving type heat sealing device is generally employed. Thus, multi-row molding, charging and sealing cannot be performed simultaneously as in the case of the four-sided sealing bag and hence the packaging efficiency is lower. The commercial demand for packaging is relatively low because of inferior packaging appearance of the flat bag as compared to the four sided sealing bag.

The pillow-shaped bag is in most widespread use. The pillow-shaped bag has a in-package capacity ($cm^3$)/surface area of packaging film ($cm^2$) ratio higher than the flat bag thus having superior packaging efficiency. The jointed sealing, which is the commonplace sealing method, is inferior to the envelope sealing in sealing appearance and in completeness in sealing. In general, a vertical moving type heat sealing machine is used for heat sealing the contents and for bag molding and bag manufacture, for simultaneously realizing multi-row molding, charging and sealing.

Since the heat-sealing surfaces of the four-sided sealed bag are sealed together, the single-sided heat-melt film is used. Since all sides are sealed, the packaging inner capacity ($cm^3$) to the packaging film surface area ($cm^2$) ratio is smallest so that the packaging efficiency is most inferior. However, since the heat-melted layers occur in the interface of two neighboring layers, heat conduction to sealing interface of the sealer is fastest and the uniformity in pressurization is optimum so that the bag is most excellent in sealing speed and completeness in sealing. In general, the vertical type FFS machine is used, and the multi-row bag forming-charging-sealing can be realized simultaneously. Moreover, as compared to the pillow-shaped bag, only little peeling stress operates during charging sealing on the sealing interface, so that there is no necessity of taking the hot seal peeling into account. Thus, charging packaging can be realized most promptly and the high-speed sealing performance is superior. The merit of the four-sided seal bag is the smoother bag surface and a larger surface area thus assuring an increased information transmitting capacity. Therefore, this bag is suited for consumer packaging (commercial packaging) which is in need of printing of a larger amount of the information useful for the purchaser. As a special instance, a label seal having a commercial label printing portion on the top of the four-sided seal bag is used.

There are a variety of packaging films used for a small-sized three-sided seal or four-sided seal bags. These packaging films range from the simplest monolayer film to a solution coated film, heat melt extruded coated film, a multi-layer co-extruded film, uniaxial stretched film, a biaxial stretched film, on which thin aluminum, aluminum oxide or silicon oxide films are optionally vapor deposited. These films are used as a monolayer film or as compound multi-layered film obtained by a variety of laminating methods for satisfying the functions required for packaging.

The gazette bag is provided with folded portions on its both sides and has a larger packaging inner capacity ($cm^3$)/surface of the packaging material ($cm^2$) and is classified into (i) a self-opening square-bottomed bag, (ii) a satchel bottomed bag and (iii) seal square-bottomed bag. The self-opening square-bottomed bag (SOS) is of a 1 to 3-ply structure and is formed of machine-made paper, polyethylene-coated paper, aluminum foil, and a variety of laminated films. The top portion is hermetically sealed by sewing or adhesion. This gazette bag is displayed on a display shelf of a store in an upstanding state or in a laid down state to exhibit superior display characteristics as compared to other bags. The satchel square-bottomed bag is of a 1 or 2-ply structure and is hermetically sealed with an adhesive. The top portion is hermetically sealed by gathering or torsional sealing depending on the application. This gazette bag can be displayed on a shelf in the upstanding or laid-down state and is superior in display performance.

The seal square-bottomed bag is heat-sealed by a film or coating and is designed for preventing light intrusion from the bottom side. The seal portion is optionally fold-sealed on to two plies for preventing light intrusion from the bottom side. The folded portion is also optionally secured with an adhesive tape for securing the fold and for setting the appearance in order. The sealed square-shaped bottomed bag basically has its inner side constituted by a sealant layer and is generally formed by a single-layered or co-extruded LDPE resin, an L-LDPE resin, EVA resin, MDPE resin, HDPE resin and a variety of PP resins. The main base material is mainly paper and biaxially stretched resins, such as biaxially stretched PP resin or biaxially stretched PET resin. If heat-sealing performance is required for heat fusion, a main substrate on the surface of which a polyolefin resin is coated or laminated is employed. For strengthening the required functions, a variety of barrier materials are used. If shape retention properties or strength is particularly required for an upstanding article, a high Young's modulus material (material with high tensile elastic modulus), such as metal foil, biaxially stretched film, paper, non-woven fabric, synthetic paper sheet or cellophane, is used.

Although there is no limitation to the photosensitive material in the package easy-to-open for photosensitive material according to the present invention, these photosensitive materials may be enumerated by the silver halide photosensitive materials for photography, non-silver-halide photosensitive materials for photography, diazo photosensitive materials for photography, photosensitive resins, light-fixation type heat-sensitive materials, thermally developed photosensitive materials, photosensitive thermally sensitive materials or the photosensitive material deteriorated in quality with light or moisture, such as the above-mentioned development solution, fixation solution or dye.

In the present invention, anti-oxidants may be added for preventing thermal deterioration of the resin or lubricants for preventing adverse effects on the photographic performance of the photosensitive material. The representative examples of the anti-oxidants that may be used in the present invention are as follows:

(a) Phenolic Anti-oxidants (t is an abbreviation for tert)

Vitamin E (tocopherol), 6-t-butyl-3-methylphenyl derivative, 2·6-di-t-butyl-p-cresol, 2·6-di-t-butyl-phenol, 2·6-di-t-butyl-α-dimethylamino-p-cresol, 2·6-di-t-butyl-p-ethylphenol, 2·2'-methylenebis-(4-ethyl-6-t-butylphenol), 4·4'-butylidenebis(6-t-butyl-m-cresol), 4·4'-thiobis(6-t-butyl-m-cresol), 4·4'-dihydroxy diphenyl cyclohexane, butylated hydroxy anisole, alkylated bisphenol, styrenated phenol, 2·6-di-t-butyl-4-methylphenol, 2·6-di-t-butyl-4-ethylphenol, n-octadecyl-3-(3'·5'-di-t-butyl-4'-hydroxyphenyl)propionate, 2·2'-methylenebis(4-methyl-6-t-butylphenol), 4·4'-thiobis(3-methyl-6-t-butylphenyl), 4·4'-butylidenebis(3-methyl-6-t-butylphenol), 4·4'-thiobis(3-methyl-6-t-butylphenyl), stearyl-β(3·5-di-t-butyl-4-hydroxyphenyl)propionate, 1·1·3-tris(2-methyl-4 hydroxy-5-t-butylphenyl)butane, 1·3·5 trimethyl-2·4·6-tris(3·5-di-t-butyl-4 hydroxybenzyl)benzene, and tetrakis [methylene-3 (3·5-di-t-butyl-4-hydroxyphenyl)propionate]methane.

(b) Ketone Amine Condensate System Anti-oxidants 6-ethoxy-2·2·4-trimethyl-1·2-dihydroquinoline, 2·2·4-trimethyl-1·2-dihydroquinoline polymers and trimethyl dihydroquinoline derivatives.

(c) Allylamine Based Antioxidants phenyl-α-naphthylamine, N-phenyl-P-naphthylamine, N-phenyl-N'-isopropyl-p-phenylene diamine, N·N'-diphenyl-p-phenylene diamine, N·N'-di-β-naphthyl-p-phenylene diamine, N-(3'-hydroxybutylidene)-1-naphthylamine.

(d) Imidazolic Anti-oxidants 2-mercapto benzoimidazole, zinc salts of 2-mercapto benzoimidazole and 2-mercapto methyl benzoimidazole.

(e) Phosphitic Anti-oxidants alkylated allyl phosphite, tris(mono- and/or dinonylphenyl)phosphite, cyclic neopentane tetraylbis(2·6-di-t-butyl-4-methylphenyl)phosphite, diphenyl isodecyl phosphite, tris(nonylphenyl)phosphite sodium phosphite, tris(nonylphenyl phosphite), 2·2-methylenebis (4·6-di-t-butylphenyl)octyl phosphite, tris(2·4-di-t-butylphenyl) phosphite, and triphenyl phosphite.

(f) Thio Urea Based Anti-oxidants thiourea derivatives, 1·3-bis(dimethylamino propyl)-2-thiourea (g) Other Anti-oxidants Useful Against Air Oxidation Dilaurylthio Dipropionate The representative examples of hindered phenolic anti-oxidants are as follows: 1,3,5-trimethyl 2,4,6-tris(3,5-di-tert-butyl-4-hydroxybenzyl)benzene, tetrakis[methylene-3-(3'·5'-di-tert-butyl-4'-hydroxyphenyl)propionate]methane, octadecyl-3,5-di-tert-butyl- 4-hydroxy-hydrocinnamate, 2,2',2'-tris[(3,5-di-tert-butyl-4-hydroxyphenyl) propionyloxy]ethyl isocyanurate, 1,3,5-tris(4-tert-butyl-3-hydroxy-2,6-di-methylbenzyl]isocyanurate, tetrakis(2,4-di-tert-butylphenyl)4,4'-biphenylene diphosphite ester, 4,4'-thiobis-(6-tert-butyl-o-cresol), 2,2'-thiobis-(6-tert-butyl-4-methylphenol), tris-(2-methyl-4-hydroxy-5-tert-butylphenol)butane, 2,2'-methylene-bis-(4-methyl-6-tert-butylphenol), 4,4'-methylene-bis-(2,6-di-tert-butylphenol), 4,4'-butylidene-bis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis(6-tert-butyl-o-cresol), 4,4'-butylidene-bis(6-tert-butyl-m-cresol), and 3·9-bis{1·1-dimethyl-2-[β-(3-t-butyl-4-hydroxy-5-methylphenyl)propionyloxy]ethyl}2,4,8,10-tetraoxaspiro[5,5]undecane. Of these anti-oxidants, those melting at not less than 100° C., in particular at not less than 120° C., are preferred. The phosphorus-based anti-oxidants are effectively used in combination.

The chemical names, molecular weights, melting points and commercial names of representative marketed anti-oxidants are as follows:

(1) Phenolic Anti-oxidants n-octadecyl-3-(3',5'-di-tert-butyl 4'-hydroxyphenyl-propionate (molecular weight, 531; melting point, 50 to 54° C.; commercial name, IRGANOX 1076 (CIBA-GEIGY), MARK AO-50 (Adeca Argus), SUMILIZER BP-76 (SUMITOMO), TOMINOX SS (YOSHITOMI)). 2,4-bis-[(n-octylthio)-6-(4-hydroxy-3,5-di-t-butylanilino)-1,3,5-triazine)](molecular weight, 589; melting point, 91 to 96° C.; commercial name, IRGANOX 565 (CIBA-GEIGY)). 2,2'-methylene-bis-[6-(1-methyl cyclohexyl)-p-cresol] (molecular weight, 421, melting point >130° C., commercial name, NONOX WSP (ICI)). 4,4'-thio-bis-[(3-methyl-6-tert-butyl)phenol](molecular weight, 358; melting point, 161 to 164° C.; commercial name, SANTONOX (MONSANTO), SUMILIZER WX R(SUMITOMO), ANTAGE CRYSTAL (KAWAGUCHI)). 2,2-thio-diethylene-bis-[3-(3,5-di-t-butyl-4-hydroxy)phenyl]propionate (molecular weight, 643; melting point, >63° C.; commercial name, IRGANOX 1035 (CIBA-GEIGY)). 2,2'-methylene-bis-(4-methyl-6-t-butylphenol) (molecular weight, 341; melting point >120° C.; commercial name, ANTAGE W-400 (KAWAGUCHI), NOCLIZER NS-6 (OUCHI-SHINKO)). calciumbis-[(ethyl-3,5-di-tert-butyl)-4-hydroxybenzyl phosphate](molecular weight, 695; commercial name, IRGANOX 1425WL (CIBA-GEIGY)). 3,9,bis[1,1-di-methyl-2-{β-(3-t-butyl-4-hydroxy-5-methylphenyl)propionyloxy}ethyl]-2,4,8,10-tetraoxaspiro[5,5]undecane (molecular weight, 741; melting point, 123 to 126° C.; commercial name, MARK AO-80 (Adeca Argus), SUMILIZER GA-80 (SUMITOMO)). 1,1,3-tris(2-methyl- 4-hydroxy-5-tert-butylphenyl)butane (molecular weight, 545; melting point, 185 to 188° C.; commercial name, TOPANOL CA (ICI), MARK AO-30 (Adeca Argus)). tris-(3,5-di-tert-butyl-4-hydroxybenzyl) isocyanurate (molecular weight, 784; melting point, 218 to 223° C.; commercial name, MARK AO-20 (Adeca Argus), IRGANOX 3114 (CIBA-GEIGY)). 1,3,5-trimethyl-2,4,6-tris-(3,5-di-t-butyl-4-hydroxybenzyl)benzene (molecular weight, 775; melting point, 240° C.; commercial name, MARK AO-330 (Adeca Argus) and IRGANOX 1330 (CIBA-GEIGY)). tris-(4-tert-butyl-2,6-di-methyl-3-hydroxybenzyl)isocyanurate (molecular weight, 700; melting point, 145 to 155° C.; commercial name, CYANOX 1790 (ACC)). tetrakis-[methylene-3-(3',5'-di-tert-butyl-4'-hydroxy-phenyl)propionate]methane (molecular weight, 1178; melting point, 110 to 125° C.; commercial name, IRGANOX 1010 (CIBA-GEIGY), MARK AO-60 (ADECA ARGUS), SUMILIZER BP-101 (SUMITOMO), TOMINOX TT (YOSHITOMI)).

(2) Phosphorus-based Anti-oxidants tris(2,4-di-tert-butylphenyl)-phosphite (molecular weight, 647; melting point, 180 to 186° C.; commercial name, IRGAFOS 168 (CIBA-GEIGY), MARK 2112 (ADECA AEGUS)). distearyl pentaerythritol diphosphite (molecular weight, 733; melting point, up to 52° C.; commercial name, WESTON 618 (BORGWARNER), MARK PEP-8 (ADECA ARGUS)). di(2,4-di-tert-butylphenyl)-pentaerythritol diphosphite (molecular weight, 605; melting point, 160 to 175° C.; commercial name, ULTRANOX 626 (BORGWARNER), MARK PEP-24G (ADECA ARGUS)). bis-(2,6-di-tert-butyl-4-methylphenyl)pentaerythritol diphosphite (molecular weight, 633; melting point, up to 237° C.; commercial name, MARK PEP-36 (ADECA ARGUS)). 9,10-dihydro-9-oxa-10-phospho phenanthrene-10-oxide (molecular weight, 216; melting point, 115° C.; commercial name, HCA (SANKO)).

(3) Thioether Based Antioxidants dilauryl-3,3'-thiodipropionate (molecular weight, 515; melting point >38° C.; commercial name, DLTDP "YOSHITOMI" (TOSHITOMI), SUMILIZER TPL (SUMITOMO), ANTIOX L (NICHI-YU)). dimyristyl-3,3'-thiodipropionate (molecular weight, 571; melting point 47 to 54° C.; commercial name, DMTD "YOSHITOMI" (YOSHITOMI), SUMILIZER TPM (SUMITOMO), ANTIOX M (NICHI-YU)). distearyl-3,3'-thiodipropionate (molecular weight, 683; melting point 61 to 68° C.; commercial name, DSTP "YOSHITOMI" (YOSHITOMI), SUMILIZER TPS (SUMITOMO), ANTIOX S (NICHI-YU)). pentaerythritol-tetrakis-(β-lauryl-thiopropionate) (molecular weight, 1162; melting point >46° C.; commercial name, SEENOX 412S (CYPRO), MARK AO-412S (ADECA ARGUS), SUMILIZER TP-D (SUMITOMO)). bis[2-methyl-4{3-n-alkylthio propionyloxy}-5-tert-butylphenyl]sulfide (molecular weight, 874 to 927; commercial name, MARK AO-23 (ADECA ARGUS). phosphorus acide [1,1-biphenyl-4,4'-zyl-bis tetrakis [2,4- bis(1,1-dimethylethyl)phenyl]ester (molecular weight, 1035; melting point 75 to 95° C.; commercial name, SANDSTAB P-EPQ (SAND), IRGAFOS P-EPQ FF (CIBA-GEIGY)). 3,5-di-tert-butyl-4-hydroxy benzyl phosphite di-ethylester (molecular weight, 356; melting point 117 to 122° C.; commercial name, IRGANOX 1222 (CIBA-GEIGY)). tris (mixed mono-di-nonylphenyl-phosphite (molecular weight, 815; commercial name, MARK 329K (ADECA ARGUS), WESTON 399 (BORGWARNER)). tetra tridecyl 4,4'-butylidene bis-(3-methyl-6-t-butylphenol)-di-phosphite (molecular weight, 1238; commercial name, MARK 260 (ADECA ARGUS)). hexa tridecyl 1,1,3-tris(2-methyl-4-hydroxy-5-t-butylphenyl)butane triphosphite (molecular weight, 1828; commercial name, MARK 522A (ADECA ARGUS)).

(4) Metal Deactivators 2,2'-oxaminobis-[ethyl 3-(3,5-di-t-butyl]4-hydroxyphenyl)propionate] (molecular weight, 697; melting point 178° C.; commercial name, NAUGARD XE-1 (UNIROYAL)). decamethylene dicarboxylic acid disalicyloyl hydrazide (molecular weight, 498; melting point 200° C.; commercial name, MARK CDA-6 (ADECA ARGUS)). N,N'-bis[3-(-3,5-di-t-butyl-4-hydroxyphenyl)propionyl] hydrazine (molecular weight, 552; melting point 227° C.; commercial name, IRGANO(MD-1024 (CIBA-GEIGY)). Isophthal bis-[2-phenoxy propionyl hydrazide (molecular weight, 490; melting point >225° C.; commercial name, CUNOX (MITSUI-TOATSU)). 3-(N-salicyloyl)amino 1,2,4 triazol (molecular weight, 204; melting point 325° C.; commercial name, MARK CDA 1 (ADECA ARGUS)).

By improving the fluidity of the resin, it becomes possible to add lubricants to prevent melt fracture or generation of micro-grids and thereby to prevent scratches or molding troubles.

The representative marketed lubricants and the names of the makers are given below.

(1) fatty acid amide based lubricants

[saturated fatty acid amide based lubricants]

(1) behenic acid amide based lubricants; Diamid KN (NIPPON KASEI).

(2) stearic acid amide based lubricants; Armide HT (LION YUSHI), Alflow S-10 (NIPPON YUSHI), fatty acid amide S (KAO), Diamid 200 (NIPPON KASEI), Diamid AP-1 (NIPPON KASEI), Amide S·Amide T (NITTOH KAGAKU), Neutron-2 (NIPPON SEIKA).

[hydroxy stearic acid mide based lubricants]

(i) palmitic acid amide based lubricants; Neutron S-18 (NIPPON SEIKA), Amide P (NITTOH KAGAKU).

(ii) lauric acid amide based lubricants; Armide C (LION·ACZ 0), Diamid (NIPPON KASEI).

[unsaturated fatty acid amide based lubricants]

(1) erucic acid amide based lubricants; Alflow-P-10 (NIPPON YUSHI), Neutron-S (NIPPON SEIKA), LUBROL (I.C.I), Diamid L-200 (NIPPON KASEI).

(ii) oleic acid amide based lubricants; Armoslip CP (LION·A CZO), Neutron (NIPPON SEIKA), Neutron E-18 (NIPPON SEIKA), Amide 0 (NITTOH KAGAKU), Diamid O-200·Diamid G-200 (NIPPON KASEI), Alflow-E-10 (NIPPON YUSHI), fatty acid amide O (KAO).

[bis fatty acid amide based lubricants]

(1) methylene bis behenic acid amide based lubricants; Diamid NK bis (NIPPON KASEI)

(2) methylene bis stearic acid amide based lubricants; Diamid 200 bis (NIPPON KASEI), Armowax (LION·ACZO), Bisamide (NITTOH KAGAKU)

(3) methylenebis oleic acid amide based lubricants; Lubron O (NIPPON KASEI)
(4) ethylenebis stearic acid amide based lubricants; Armoslip EBS (LION·ACZO)
(5) hexamethylene bis stearic acid amide based lubricants; Amide 65 (KAWAKEN FINE CHEMICALS)
(6) hexamethylene bis oleic acid amide based lubricants; Amide 60 (KAWAKEN FINE CHEMICALS)
(2) non-ionic surfactant based lubricants; Electrostripper TS-2, Electrostripper TS-3 (KAO)
(3) hydrocarbon based lubricants; fluid paraffin, natural paraffin, micro-wax, synthesized paraffin, polyethylene wax (with the number averaged molecular weight of not more than 10,000, preferably not more than 8000 and, in particular, not more than 6,000), polypropylene wax (with number average molecular weight of not more than 10,000, preferably not more than 8,000 and, in particular, not more than 6,000), chlorinated hydrocarbons, fluorocarbons.
(4) fatty acid based lubricants; higher fatty acid (preferably not less than C12; specifically, caproic acid, stearic acid, oleic acid, erucic acid and palmitic acid) and oxy-fatty acid.
(5) ester based lubricants; lower alcohol esters of fatty acids, polyhydric alcohol esters of fatty acids, polyglycol esters of fatty acids and aliphatic alcohol esters of fatty acids.
(6) alcoholic lubricants; polyhydric alcohols, polyglycols and polyglycerols.
(7) metal soap; compounds of higher fatty acids, such as lauric acid, stearic acid, succinic acid, stearyl lactic acid, lactic acid, phthalic acid, benzoic acid, hydroxy stearic acid, ricinoleic acid, naphthionic acid, oleic acid, palmitic acid or erucic acid with metals, such as Li, Na, Mg, Ca, Sr, Ba, Zn, Cd, Al, Sn, Pb or Cd; preferably magnesium stearate, calcium stearate, zinc stearate and magnesium oleate.
(8) partial oxides of montanic acid esters
(9) silicone based lubricants; dimethyl polysiloxane of various grades and its modified products (Shin-Etsu silicone, Toray silicone); in particular, various silicone oils are preferred since these not only improve fluidity of the resin and improve lubricity but also improve peeling from heat sealing bars during heat sealing and, on being used in conjunction with light-shielding materials, improve dispersion of the light-shielding materials and make the resin turbid to increase haze (ASTM D-1003) to realize unforeseen results such as improved coloration power and light-shielding performance.

BRIEF DESCRIPTION OF THE DRAWINGS

FIGS. 15-1, 15-2 and 15-3 shows an easy-to-open packaged photosensitive material for a roll-shaped photosensitive material embodying the present invention.

FIG. 16-1 shows an easy-to-open packaged photosensitive material employing a layered film as a hermetically sealing and light shielding bag of a photographable film package (termed a lensed film unit package or a camera package with a built-in lens) embodying the present invention.

FIG. 16-2 shows the process of hermetically sealing and packaging the main body of the lensed film unit in a light shielding bag.

Figure 1:
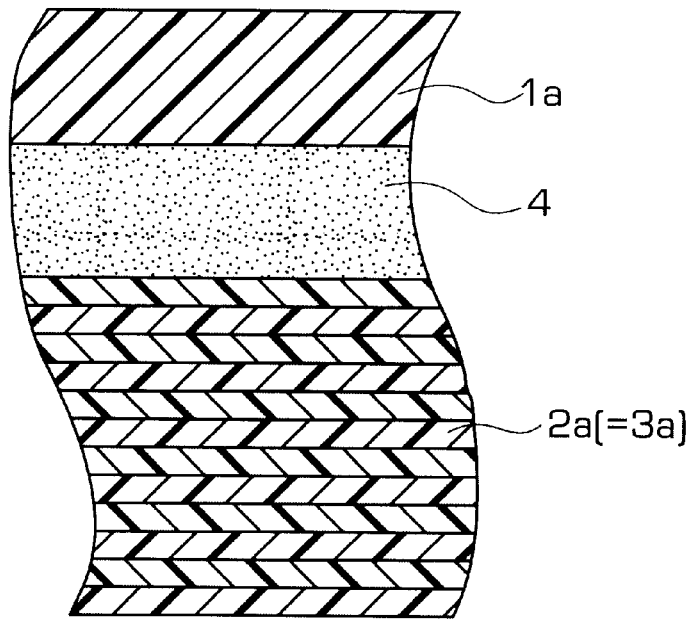
FIG. 1 is a schematic cross-sectional view of a three-layered light shielding layered film employed for a package easy-to-open for photosensitive material.

EXAPLANATION OF NUMERALS a, . . . light-shielding layer;
1, 1a, . . . biaxially stretched plastic film layer
2, 2a, . . . heat fused layer;
3, 3a, . . . plastic film layers molecular-oriented in the flow direction to TD/TM not less than 3;
4, 4a, . . . adhesive layers;
5, . . . flexible sheet layers other than the biaxially stretched plastic film layer;
Ia, . . . multi-layered co-extruded biaxially stretched plastic film layer;
IIa, . . . double-layer co-extruded film layer;
IIIa, . . . three-layer co-extruded film layer;
6, . . . gazette bag;
7, . . . top heat sealing portion;
8, . . . bottom heat sealing portion;
9, . . . machi portion;
10, . . . center heat sealing portion;

11, . . . serrated portion;
16, . . . vee notch;
17, . . . three-sided heat-sealing flat bag;
22, four-sided heat-sealing flat bag;
24-1, 24-2, . . . vee notches;
26, . . . band-shaped photosensitive material;
27, . . . envelope for outer periphery;
37, . . . roll-shaped photosensitive material;
39, . . . light-shielding leader;
40, . . . envelope for lateral side;
50, . . . easy-to-open packaged photosensitive material;
58, . . . main body portion of a lensed film unit;
81, . . . MD direction.

DETAILED DESCRIPTION OF THE PREFERRED EMBODIMENTS

Referring to the drawings, illustrative embodiments of the present invention will be explained. The present invention, however, is not limited to these merely illustrative embodiments.

FIGS. 1 to 9 are partial schematic cross-sectional views showing a layered structure of a laminated film having complete light-shielding performance, employed for a package easy-to-open for photosensitive material. A layered film having complete light shielding performance of FIG. 1 is comprised of a biaxially stretched light shielding plastic film layer 1a layered via an adhesive layer 4 on a plastic film layer 3a molecular-oriented in the flow direction. The plastic film layer 3a molecular-oriented in the flow direction is also a light-shielding thermally fusible thermoplastic resin film layer 2a.

Figure 2:
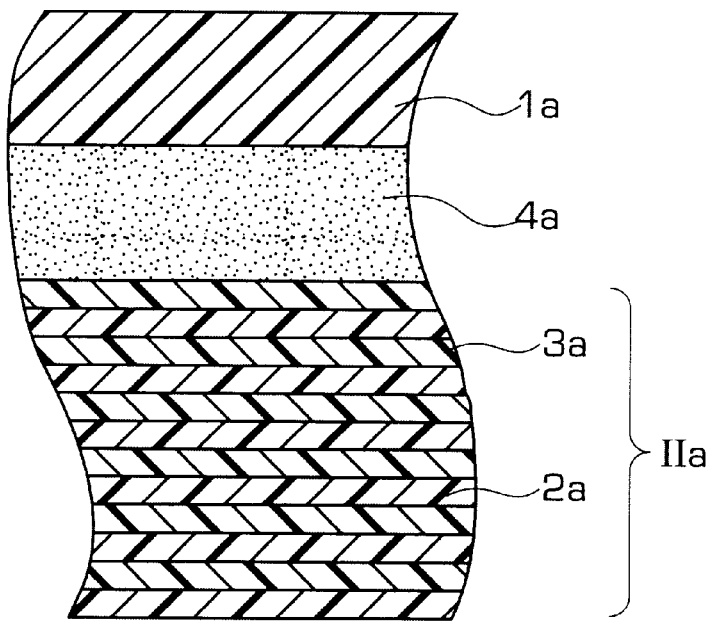
FIG. 2 is a schematic cross-sectional view of a four-layered light shielding layered film employed for a package easy-to-open for photosensitive material.

A layered film having complete light shielding performance, shown in FIG. 2, is comprised of a biaxially stretched plastic film layer 1, layered via a light-shielding adhesive layer 4a on a double-layer light-shielding co-extruded film layer IIa. The film layer IIa in turn is comprised of a light-shielding plastic film layer 3a, molecular-oriented in the flow direction, and a light-shielding heat-fusible thermoplastic resin film layer 2a.

Figure 3:
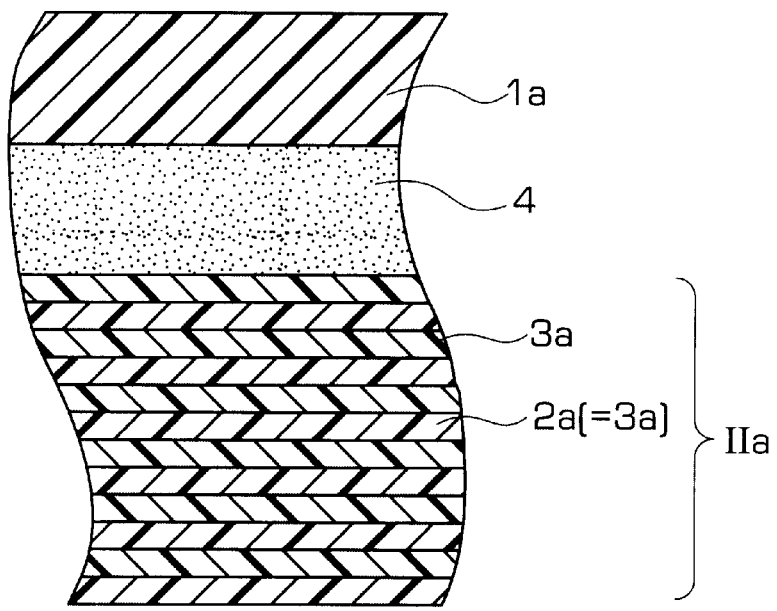
FIG. 3 is a schematic cross-sectional view of a four-layered light shielding layered film employed for a package easy-to-open for photosensitive material.

A layered film having complete light shielding performance, shown in FIG. 3, is comprised of a biaxially stretched plastic film layer 1a, layered via an adhesive layer 4, on two light-shielding plastic film layers 3a molecular-oriented in the flow direction layered together to form a light-shielding double-layer co-extruded film layer IIa. The innermost plastic film layer 3a, molecular-oriented in the flow direction, is also a light-shielding heat-fusible thermoplastic resin film layer 2a.

Figure 4:
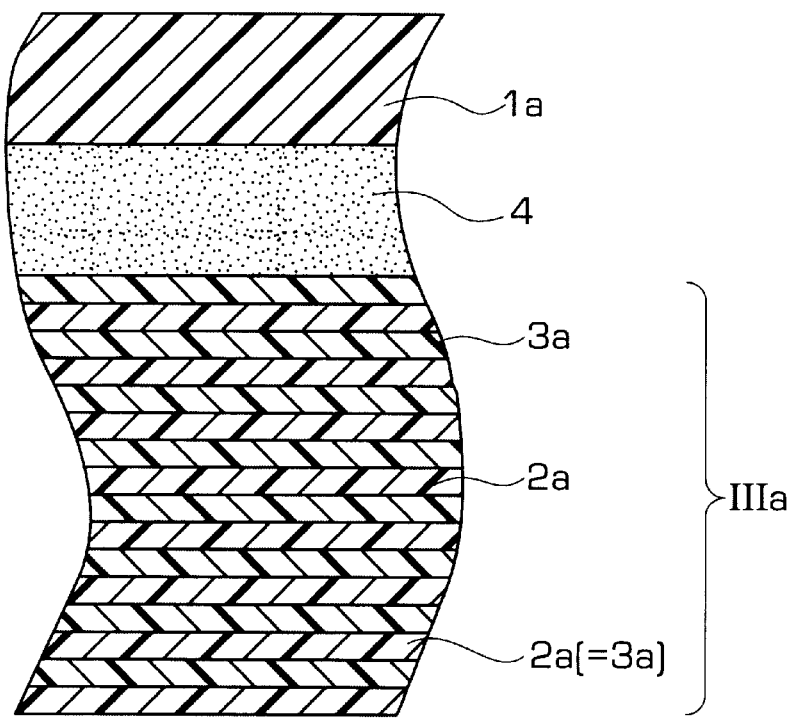
FIG. 4 is a schematic cross-sectional view of a five-layered light shielding layered film employed for a package easy-to-open for photosensitive material.

A layered film having complete light shielding performance, shown in FIG. 4, is comprised of a biaxially stretched plastic film layer 1, layered via an adhesive layer 4, on three light-shielding plastic film layers 3a molecular-oriented in the flow direction layered together to form a light-shielding three-layer co-extruded film layer IIIa. The innermost plastic film layer 3a, molecular-oriented in the flow direction, is also a light-shielding heat-fusible thermoplastic resin film layer 2a.

Figure 5:
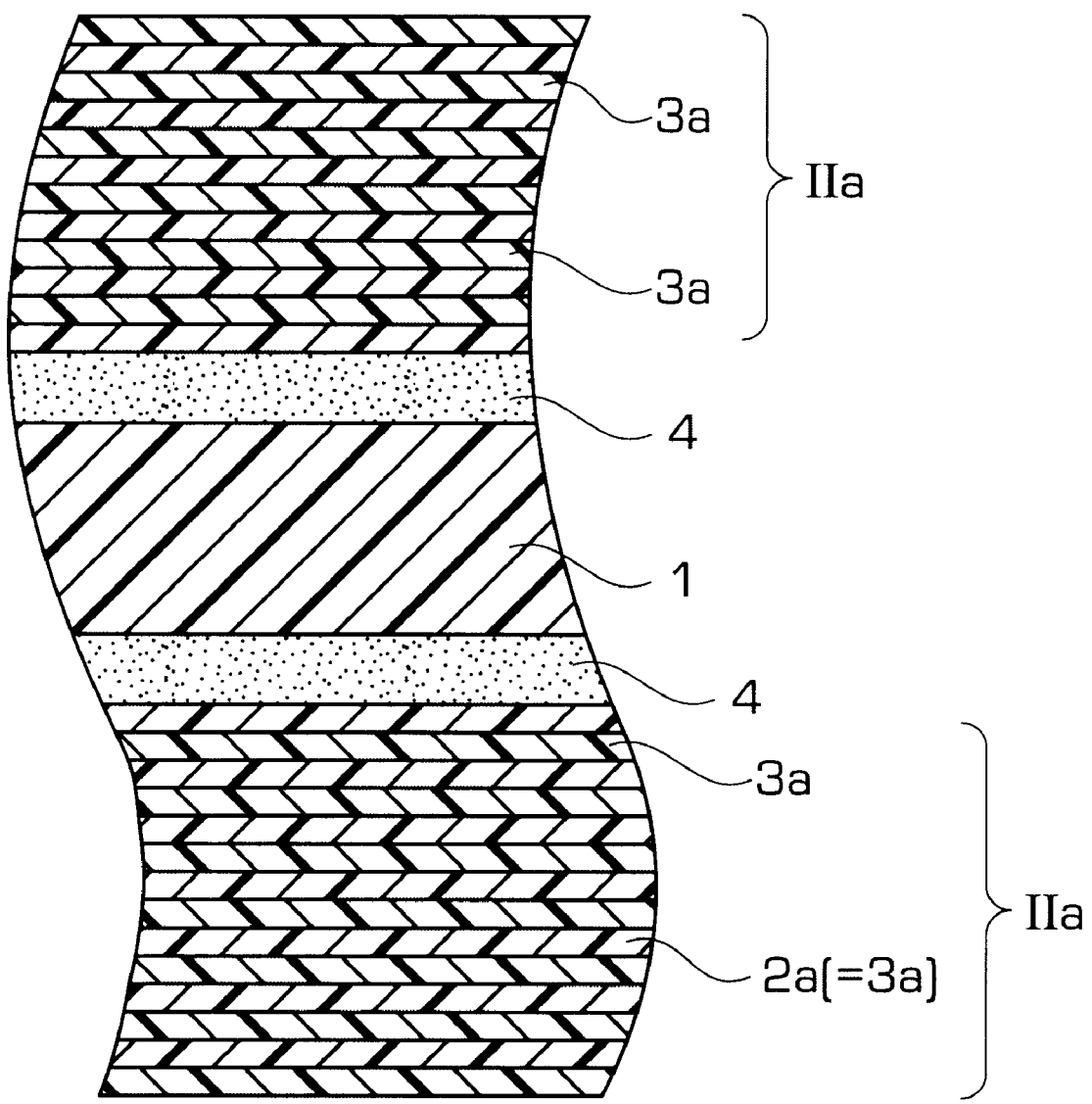
FIG. 5 is a schematic cross-sectional view of a seven-layered light shielding layered film employed for a package easy-to-open for photosensitive material.

A layered film having complete light shielding performance, shown in FIG. 5, is of a symmetrical layered structure centered about a biaxially stretched plastic layer 1, and is comprised of the biaxially stretched plastic layer 1 on each of an inner side and an outer side of which is layered, via an adhesive layer 4, a light-shielding double-layer co-extruded film layer IIa made up of two light-shielding plastic film layers 3a, molecular-criented in the flow direction, layered together. The innermost plastic film layer 3a, molecular-oriented in the flow direction, is also a light-shielding heat-fusible thermoplastic resin film layer 2a. The inner side and the outer side denote the side of the layered film towards the photosensitive material and the opposite side thereof, respectively.

Figure 6:
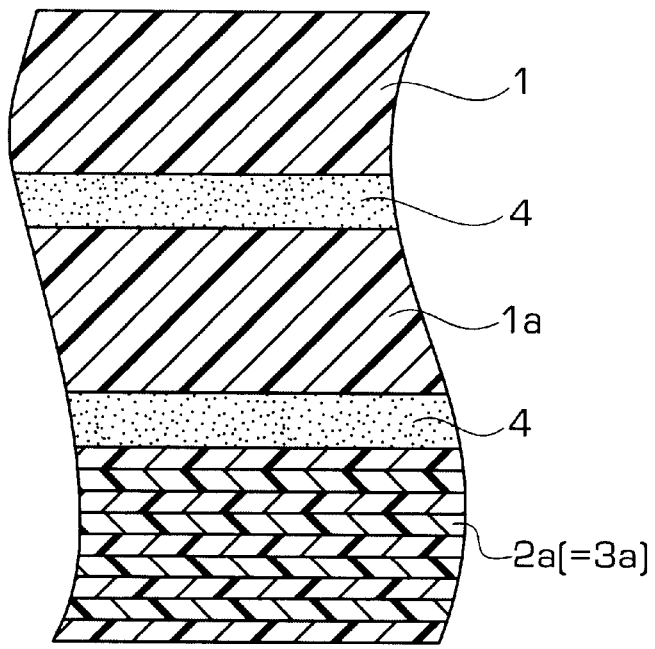
FIG. 6 is a schematic cross-sectional view of a five-layered light shielding layered film employed for a package easy-to-open for photosensitive material.

A layered film having complete light shielding performance, shown in FIG. 6, is made up of a light-shielding biaxially stretched plastic film layer 1a, on an outer side and an inner side of which a biaxially stretched plastic film layer 1 and a light-shielding plastic film layer 3a, via each adhesive layer 4. The light-shielding plastic film layer 3a is molecular-oriented in the flow direction. The innermost plastic film layer 3a, molecular-oriented in the flow direction, is also a light-shielding heat-fusible thermoplastic resin film layer 2a.

Figure 7:
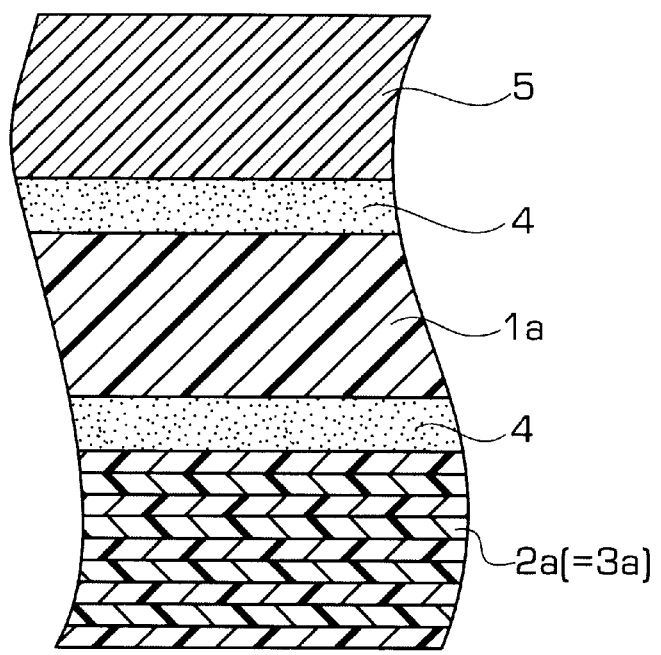
FIG. 7 is a schematic cross-sectional view of a five-layered light shielding layered film employed for a package easy-to-open for photosensitive material.

A layered film having complete light shielding performance, shown in FIG. 7, is of the same layered structure as that of FIG. 6 except that a flexible sheet layer other than the biaxially stretched plastic film layer (a flexible sheet layer 5) is used in place of the outermost biaxially stretched plastic film layer 1 in FIG. 6.

Figure 8:
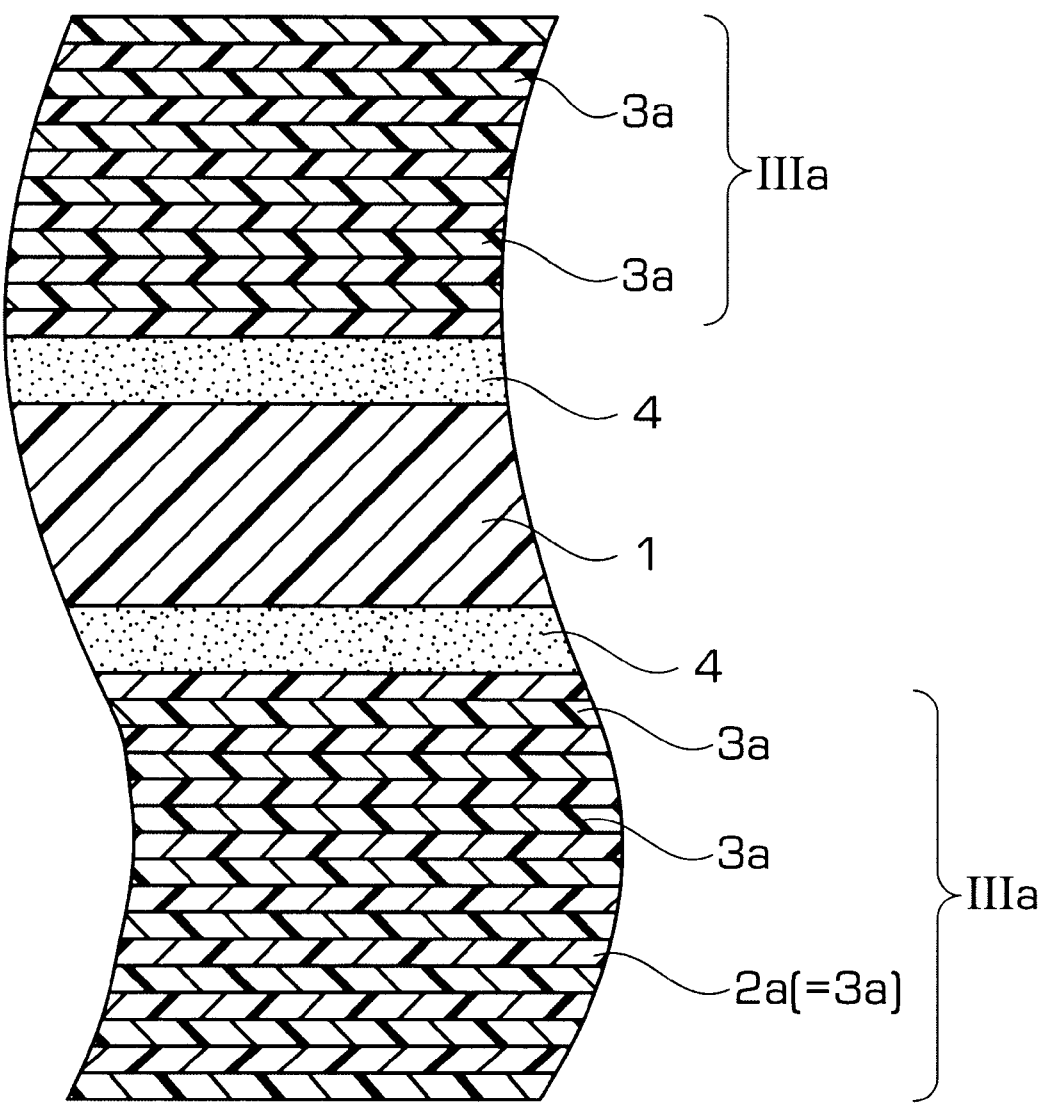
FIG. 8 is a schematic cross-sectional view of a nine-layered light shielding layered film employed for a package easy-to-open for photosensitive material.

A layered film having complete light shielding performance, shown in FIG. 8, exhibits complete light shielding performance and is of the same layered structure as that of FIG. 5 except that a light-shielding three-layer co-extruded film IIIa is used in place of the light-shielding two-layer co-extruded film IIa in FIG. 5.

Figure 9:
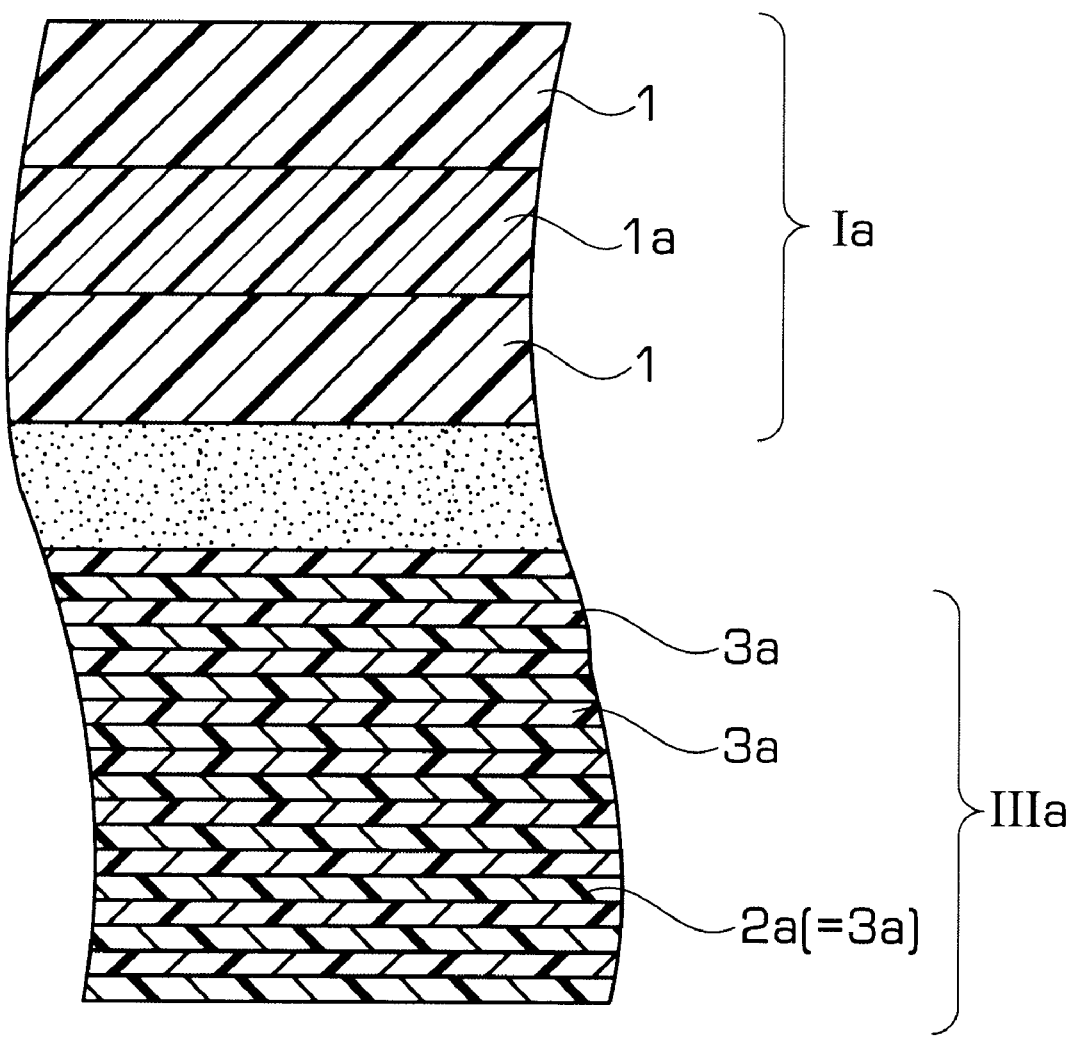
FIG. 9 is a schematic cross-sectional view of a seven-layered light shielding layered film employed for a package easy-to-open for photosensitive material.

A layered film having complete light shielding performance, shown in FIG. 9, is of the same layered structure as that of FIG. 4 except that a three-layer co-extruded biaxially stretched plastic film layer Ia is used on the both sides of the light-shielding biaxially stretched plastic film layer Ia in place of the light-shielding biaxially stretched plastic film layer 1 in FIG. 4. The three-layer co-extruded biaxially stretched plastic film layer Ia exhibits light shielding performance and is obtained by simultaneously co-extruding biaxially stretched plastic film layers 1 with the biaxially stretched plastic film layer 1a.

FIGS. 10 to 16-1 show representative package easy-to-open for photosensitive materials, in particular an easy-to-open packaged photosensitive material according to the present invention, varied depending on the product forms of the photosensitive materials to be packaged. Thus obtained packaged photosensitive material shown is designed for securing complete hermetic sealing performance and complete light shielding performance for the effective period of the photosensitive material (up to the maximum of two years or even longer) using completely light-shielding layered film having the layered structure representative examples of which are shown in FIGS. 1 to 9.

Figure 10:
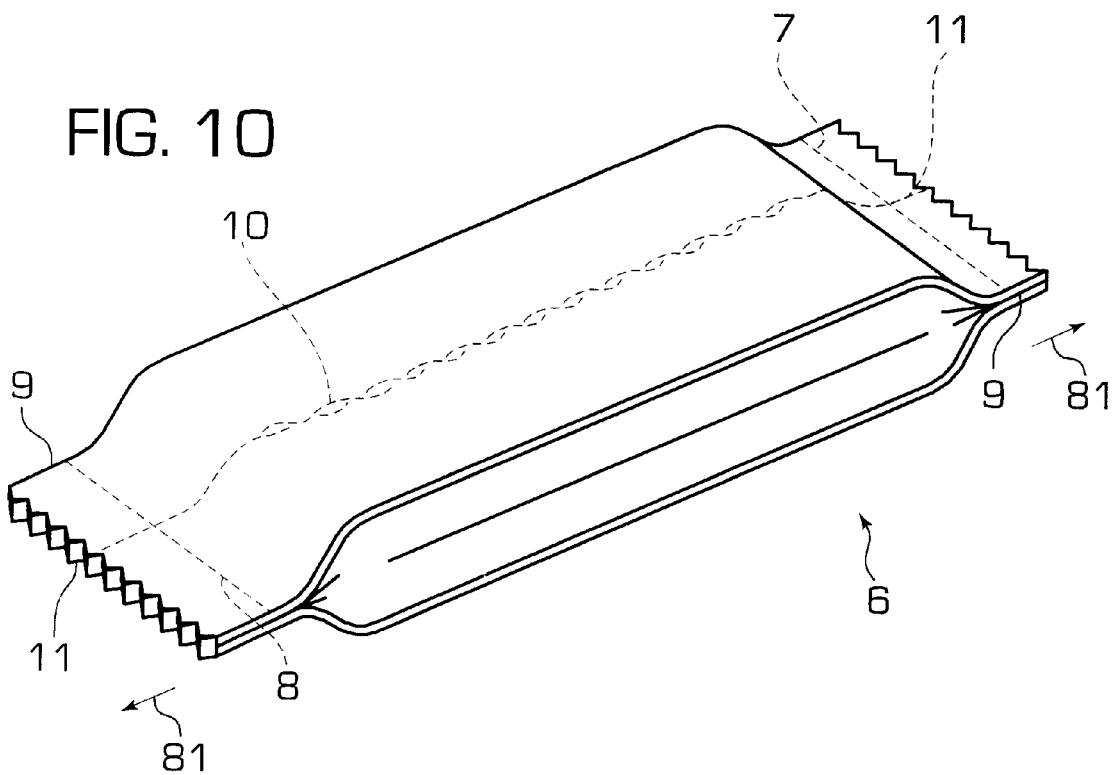
FIG. 10 shows an easy-to-open packaged photosensitive material in the present invention as a gazette bag having a machi portion and which is obtained on hermetically sealing a product of increased thickness comprised of a large number of roll-shaped photosensitive materials or sheet-shaped photosensitive materials weighing more than 500 g.

FIG. 10 shows an easy-to-open packaged photosensitive material comprised of a product of an increased thickness hermetically sealed gazette bag 6 having a machi portion 9. The product is made up of a large number of roll-shaped photosensitive materials or sheet-shaped photosensitive materials weighing not less than 500 g. For securing complete hermetic sealing and complete light shielding, a center heat sealing portion 10 is provided at a mid portion in the flow direction of the gazette bag 6, while a top heat sealing portion 7 is provided at substantially the foremost portion of the gazette bag in a direction perpendicular to the center heat sealing portion 10 for extending along the entire width. In addition, a bottom heat sealing portion 8 is provided along the entire width at substantially the rear portion of the gazette bag. A serrated portion 11 is provided at the distal end of each of the top heat sealing portion 7 and the bottom heat sealing portion 8 of the gazette bag. A small-sized version of the gazette bag 6 is useful for a packaged film unit with a lens or an instant packaged film unit.

Figure 11:
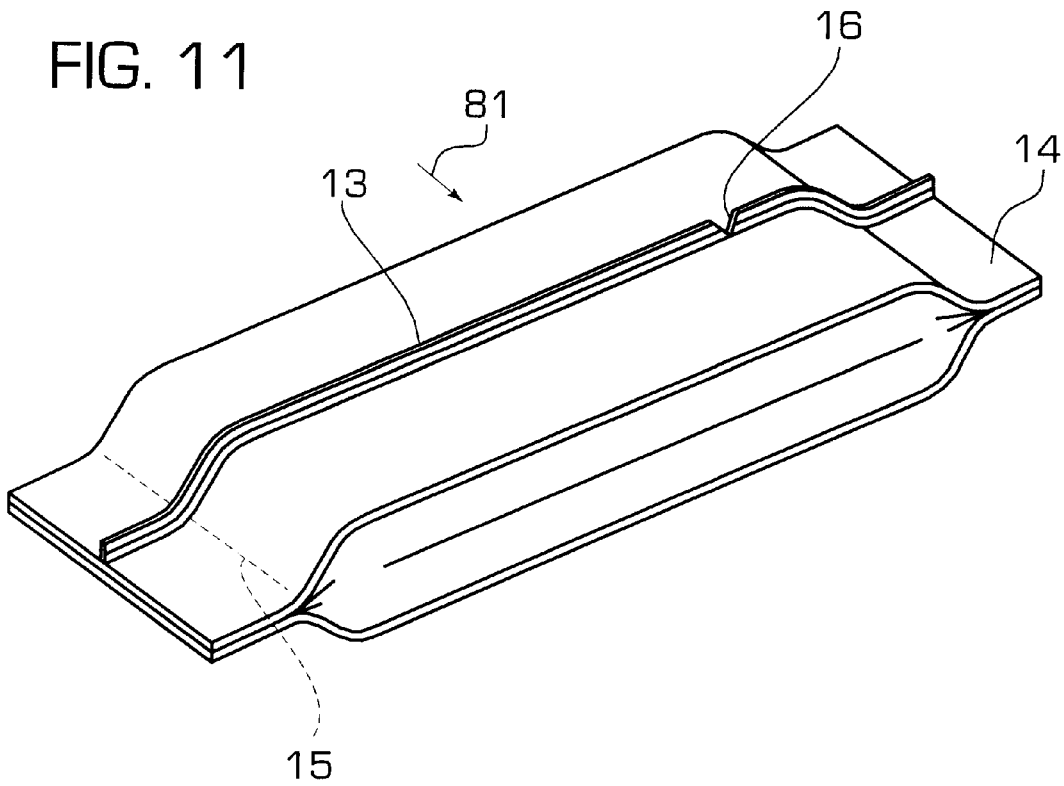
FIG. 11 shows an easy-to-open packaged photosensitive material formed by a three-sided sealed flat bag embodying the present invention.

FIG. 11 is an easy-to-open packaged photosensitive material comprised of a three-side sealed gazette bag. FIG. 11 shows a similar bag to FIG. 10 but is characterized by having a top heat sealing portion 14 and a bottom heat sealing portion 15 extending to the respective ends along the entire widths. A vee notch 16 is provided at the center sealing portion 13 for assuring easy-to-open characteristics.

Figure 12:
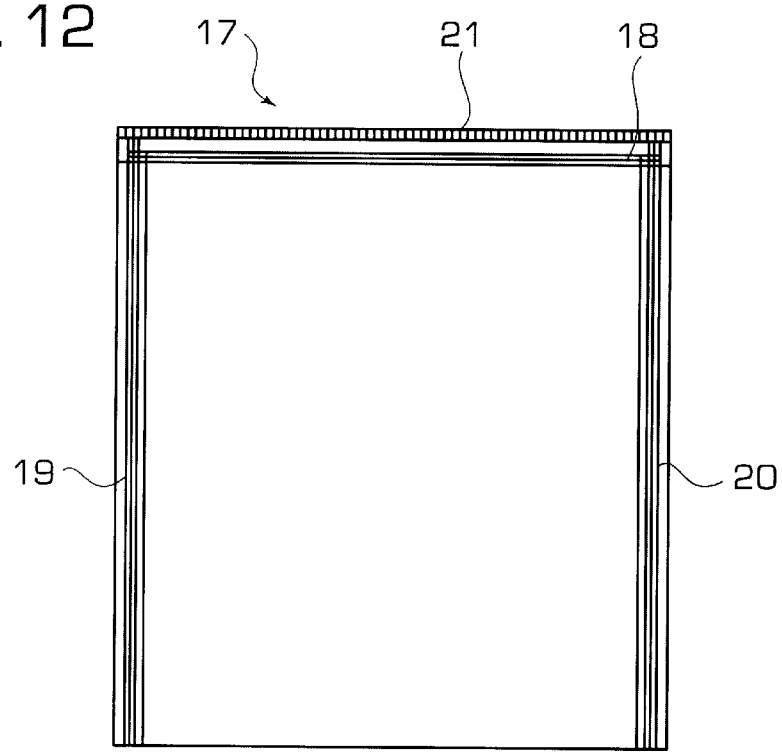
FIG. 12 shows a package easy-to-open for photosensitive material formed by a three-sided heat-sealed flat bag embodying the present invention.

FIG. 12 shows a package easy-to-open for photosensitive material comprised of a three side heat-sealed flat bag 17. Left and right heat sealing portion 19, 20 and a top heat sealing portion 18 assure complete hermetic sealing performance and complete light shielding performance. A large number of I-notches 21 formed at the distal ends of the top heat sealing portion 18 assure easy-to-open characteristics.

Figure 13:
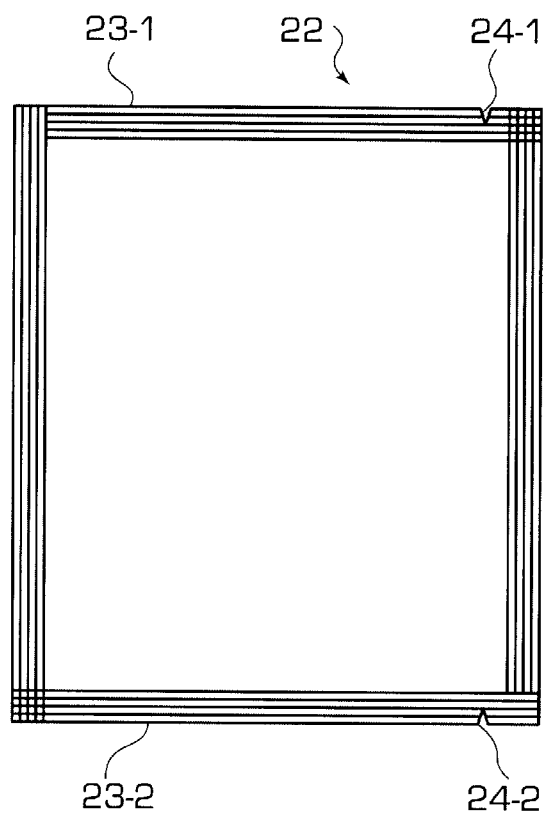
FIG. 13 shows a package easy-to-open for photosensitive material formed by a four-sided heat-sealed flat bag embodying the present invention.

FIG. 13 shows a package easy-to-open for photosensitive material comprised of a four side heat-sealed flat bag. Four heat sealing portions, provided on the front, rear, left and right sides of the flat bag, assure complete hermetic sealing and complete light-shielding performance. Two vee notches 24-1 and 24-2, provided in a top heat sealing portion 23-1 and a bottom heat sealing portion 23-2, assure easy-to-open characteristics.

Figure 14:
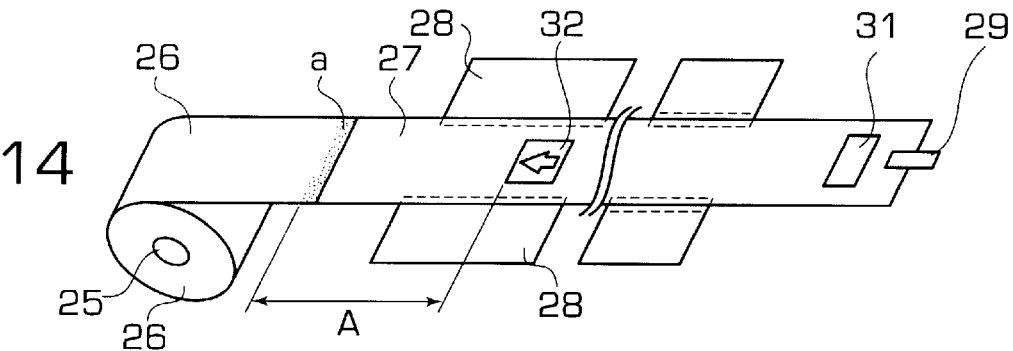
FIG. 14 shows an easy-to-open packaged photosensitive material for a band-shaped photosensitive material embodying the present invention.
Figure 14A:
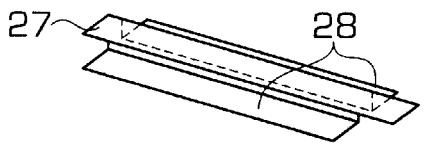
Figure 14B:
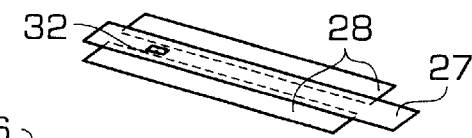
Figure 14C:
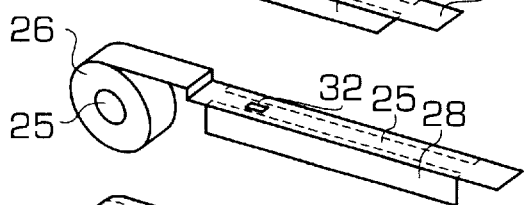
Figure 14D:
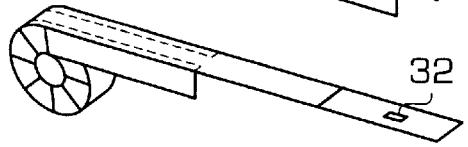
Figure 14E:
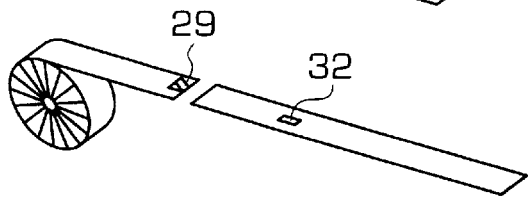
Figure 14F:
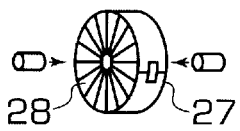
Figure 14G:
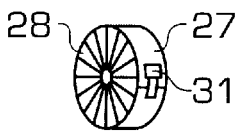
Figure 14H:
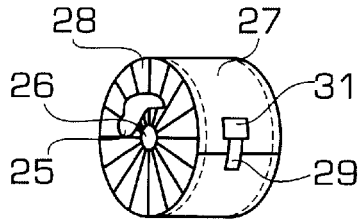

FIG. 14 shows an easy-to-open packaged photosensitive material for a band-shaped photosensitive material, disclosed in JP Patent Kokai JP-A-7-257510, and is comprised of a winding core 25 about which is wound a band-shaped photosensitive material 26. An outer peripheral envelope 27 is connected to the terminal end of the band-shaped photosensitive material 26. On both lateral lines of the outer peripheral envelope 27 is bonded a lateral side envelope 28 and an end tape 29 is bonded to the terminal end of the photosensitive material. In the vicinity of the end tape 29 is bonded a label 31 having a commercial name or the like. On the outer peripheral envelope 27 is printed a position indicating mark 32 at a distance A of 30 cm from a connection area a of the envelope 27 with the photosensitive material 26 to the end tape 29.

The layered film for the package in the package easy-to-open for photosensitive material, representative examples of which are shown in FIGS. 1 to 9, can be used as the outer peripheral envelope 27 or as the lateral side envelope 28. In particular, the layered film is preferably used as the lateral side envelope 28 since it assures linear tearing in a boundary to the outer peripheral envelope 27. The package easy-to-open for photosensitive material is manufactured by a process shown for example in (a) to (h).

Figures 1, 15:
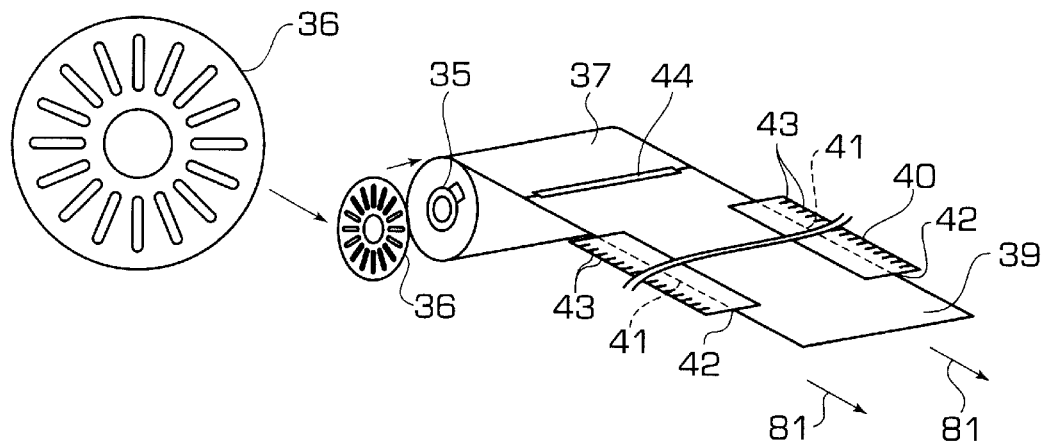
Figures 2, 15:
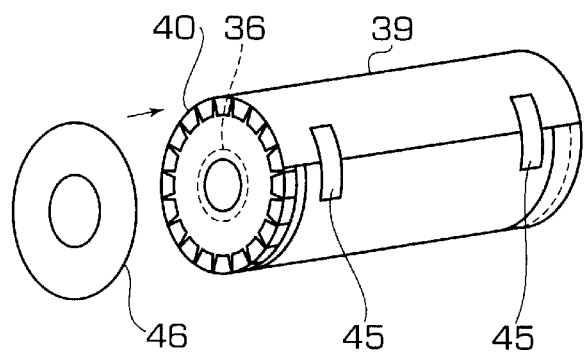
Figures 3, 15:
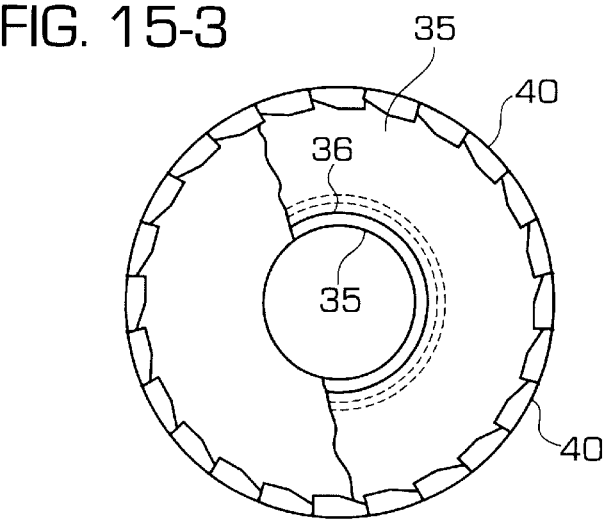
Figure 17:
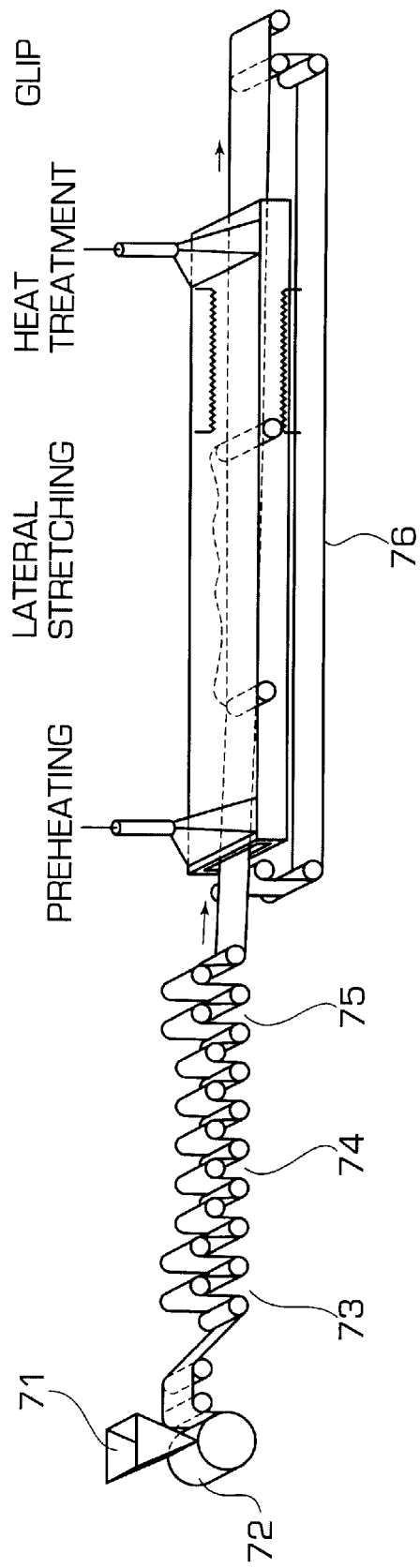
FIG. 17 schematically shows the biaxially stretching system by the tenter system.
Figure 18:
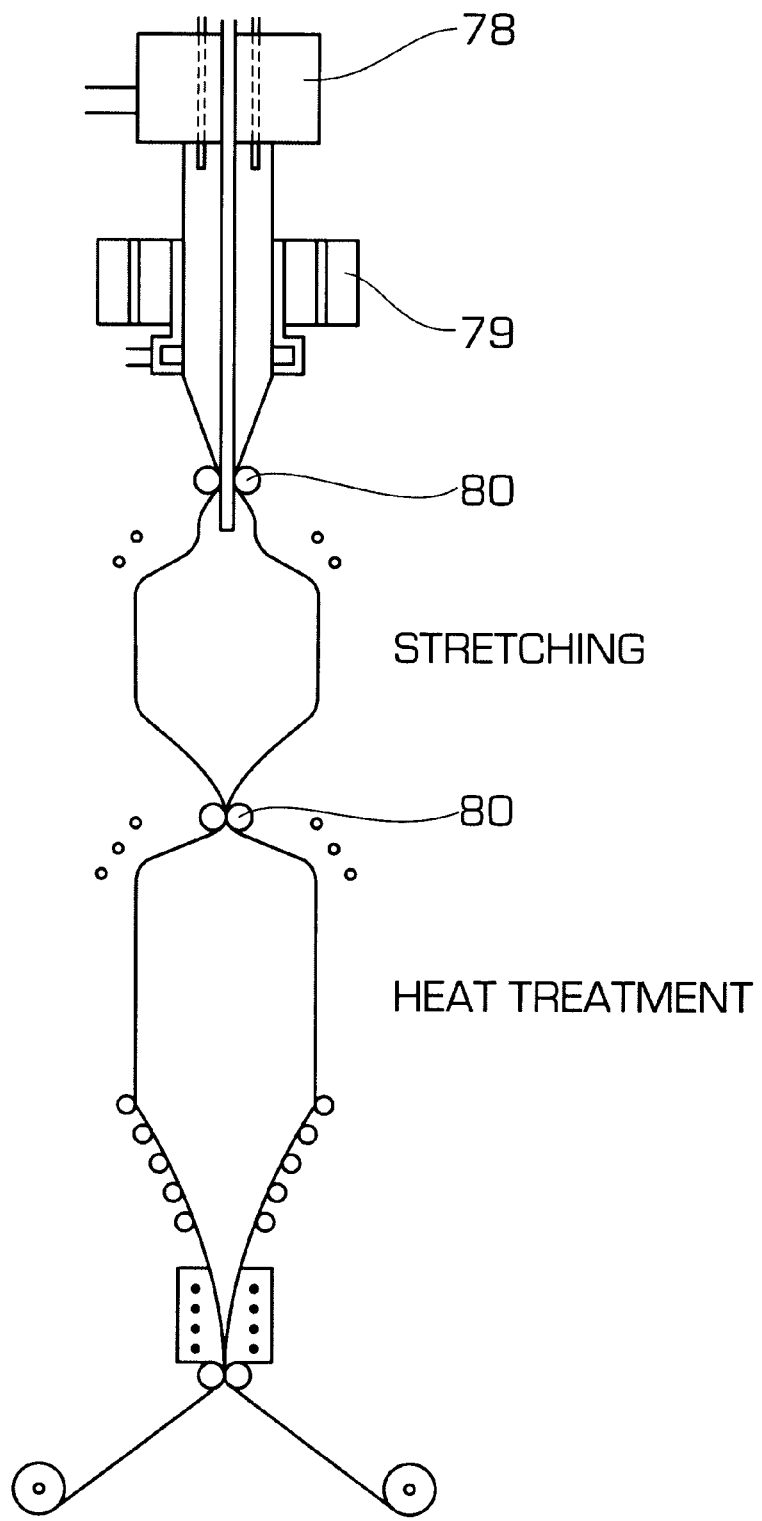
FIG. 18 schematically shows the biaxially stretching system by the tube system.

FIGS. 15-1, 15-2 and 15-3 are a packaged roll-shaped photosensitive material disclosed in JP Patent Kokai JP-A-6-214350. As shown in FIG. 15-1, an elongated photosensitive material is coiled about a light-shielding winding core 35 to form a roll-shaped photosensitive material 37. On an end surface of the light-shielding winding core 35 and the roll-shaped photosensitive material 37 is tightly positioned a doughnut-shaped side plate inner ring 36 which is secured to the end surface of the winding core 35 via an adhesive layer, not shown. To the roll-shaped photosensitive material 37 is connected a light-shielding leader 39 via a connection tape 44. The light-shielding leader is comprised of the layered film having complete light-shielding performance according to the present invention. To both lateral sides of the light-shielding leader 39 are bonded the envelopes for lateral sides 40 comprised of the completely light-shielding layered films of the present invention by the heat sealing method. The envelopes for lateral sides 40 are formed with perforations 41 for severing, a notch 42 as a incipient end for severing and a slit 43 for winding. An adhesive is then applied and bonded under pressure to a portion of the lateral side plate inner ring 36 contacted with the winding core 35. The light-shielding leader 39 is wound as shown in FIG. 15-2 and secured with an end fixing adhesive tape 45. The envelope for lateral side 40 is folded on the side plate inner ring 36 and the side plate outer ring 46 is bonded with an adhesive layer, not shown, on the side plate inner ring 36 and the envelope for lateral side 40 for completing a package easy-to-open for photosensitive material.

The layered film for the package in the package easy-to-open for photosensitive material of the present invention, representative examples of which are shown in FIGS. 1 to 9, can be used as the light-shielding leader 39 and as the envelope for lateral sides 40. In particular, if the layered film is used as the envelope for lateral sides 40, the layered film can be torn linearly along the boundary to the light-shielding leader 39 simply by forming the cut-out 42 as the incipient portion for severing without the necessity of forming the perforations 41 in the envelope for lateral sides 40. If the layered film having easy-to-open characteristics is used, the layered film can be torn linearly very easily in the vicinity of the boundary, owing to the tear strength difference on the boundary to the light-shielding leader 39, without forming the cut-out 42 as the incipient portion for severance. FIG. 15-3 shows, in a side view, the easy-to-open packaged roll-shaped photosensitive material with the side plate outer ring 36 removed.

FIG. 16-1 shows an easy-to-open packaged photosensitive material 50 employing the layered film having complete light shielding performance according to the present invention, in which a photographable packaged film is hermetically sealed under light shielding as disclosed in JP Utility Model Kokoku JP-B-7-50747 or in JP Patent Kokoku JP-B-7-1380. The packaged film is also termed a film unit 54 with a lens or a packaged camera with a built-in film. The easy-to-open packaged photosensitive material 50 of FIG. 16-1 is configured so that a lens part 55 is faced by and overlapped with a bonded side 51, and so that a hole for suspension 52 and a cut-out for opening 57 are provided on one and the other heat-sealed ends 53 and 56.

FIG. 16-2 shows the process of packaging a main body of a film unit with a lens 58 with a hermetic sealing light-shielding bag employing a layered film exhibiting complete light shielding performance as shown in FIGS. 1 to 9. The hermetic sealing light-shielding bag is a package easy-to-open for photosensitive material having a flat connecting portion in an MD direction of the layered film exhibiting complete light shielding performance, that is in the longitudinal direction of the lensed film unit, and having a suspension hole formed in one of the flat connection portions. The ISO sensitivity of the photographic film used in the lensed film unit is raised to a value as high as 100, 200, 400, 1000, 1600, 2000 or more, while the film is used by all age groups of from children to old people in the seventy years old or much older, prevention of light fogging is a crucial technique for assuring high photographic quality. However, in actual utilization, the photosensitive material needs to be opened easily by the users of all of the age groups. In this respect, the package easy-to-open for photosensitive material is optimum.

At present, in the completely light-shielding layered film employed in this hermetic sealing bag, an ethylene vinyl acetate (EVA) resin layer, which is short in easy-to-open characteristics, is used for the thermally fusible innermost layer. Since a costly aluminum film is used for affording the easy-to-open characteristics and moisture proofness, the layered film is poor in amenability to recycling and incineration. Also, since the EVA resin layer is used as the innermost heat fusible layer, bad smell like the stimulating odor of a vinegar is charged in the sealed packaged material the giving bad feeling to the user on opening the sealed packaged material for taking out the lensed film unit. In addition, the photographic properties are worsened to some extent, as typified by occurrence of unusual sensitivities, during the latter portion of the effective period due to vinyl acetate monomer in the EVA resin.

EXAMPLES

Referring to the examples, preferred embodiment of the package easy-to-open for photo sensitive material according to the present invention will be explained in further more detail, and however, the present invention is not limited thereto.

Example 1

The present Example is directed to a package easy-to-open for photosensitive material having a photosensitive material enclosed in a gazette bag of FIG. 10 employing the completely light-shielding layered film of the layered structure shown in FIG. 4. The biaxially stretched plastic film layer in FIG. 4 is a biaxially stretched polyethylene naphthalate resin film layer 20 μm in thickness (content of polyethylene glycol, 0.3%).

The characteristics of the biaxielly stretched polyethylene naphthalate resin film layer 20 μm in thickness, employed in the present embodiment, are as follows:

tensile strength by JIS K7127 is 31 kgf/mm$^2$ (304 MPa) and 33 kgf/mm$^2$ (304 MPa) for MD and for TD, respectively;

tensile elastic modulus by JIS K7127 is 570 kgf/mm$^2$ (5586 MPa) and 590 kgf/mm$^2$ (5782 MPa) for MD and for TD, respectively;

tearing propagation resistance by JIS K7128 (Elemendorf) is 8 gf/25 μm (0.08 N/25 μm) and 11 gf/25 μm (0.1 N/25 μm) for MD and for TD, as measured in terms of 25 μm, respectively;

explosion resistance by JIS C2318 is 20 kgf/25 μm (196 N/25 μm) and 22 kgf/25 μm (216 N/25 μm) for MD and for TD, as measured in terms of 25 μm, respectively;

explosion strength by JIS P8122 is 23 kg as measured in terms of 25 μm;

impact strength by JIS K6745 is 22 kg·cm/25 μm, as measured in terms of 25 μm;

number of times of flexing until destruction by JIS P8155 is not less than 10,000.

The melting point by ASTMD882-73 is 275° C.;

the water absorption rate by ASTMD882-73 is 0.4%;

density by ASTMD792 is 7.38 g/cm$^3$;

thermal contraction by JIS C2318 (150° C.×30 minutes) is 0.8% and 0.1% for MD and for TD, respectively;

water vapor transmission rate by JIS Z0208-73 (40° C., 90% RH) is 1 kg/m$^2$·24 hrs (in terms of 25 μm);

oxygen transmission rate by ASTMD882-73 (20° C., 0% RH) is 36 cc/m$^2$·24 hours·atm (in terms of 25 μm).

The three layers 3a, 3a, 3a of the three-layer co-extruded plastic film layer IIIa (the innermost layer being also a light-shielding thermoplastic resin film layer 2a) are all formed of the same resin composition and of the same thickness of 25 μm, with the thickness of the three-layer co-extruded plastic film layer IIIa being 75 μm. The static frictional coefficient between the three-layer co-extruded plastic film layers IIIa, as measured by the method of JIS K7125-1987, is 0.36.

The three-layer co-extruded plastic film layer IIIa was molded by a three-layer co-extrusion inflation film molding device from a polyethylene-bases resin composition comprised of 40 wt % of polyethylene resin (co-polymerized with 0.5 mol% of butene-1), 55.9 wt % of an ethylene-octene-1 copolymer resin, 0.2 wt % of zinc stearate, 0.05 wt % of a hindered phenolic antioxidant (IRGANOX 1010 by CIBA-GEIGY), 0.05 wt % of erucic acid amide, 0.03 wt % of a boric acid ester of glycerin mono-fatty acid ester and 3.5 wt % of furnace type carbon black (#44B) produced by MITSUBISHI KAGAKU. The polyethylene resin has an MFR as measured under condition E of ASTM D1238-88, test temperature of 190° C., test load of 2.16 kgf (21.2N) of 0.05 g/10 minutes, a density as measured by the method of ASTM D-1505 of 0.957 g/cm$^3$ and a Q-value of 27. The ethylene-octene-1 copolymer resin has an MFR as measured under condition E of ASTM D1238-88, test temperature of 190° C. and a test load of 2.16 kgf (21.2N) of 2.2 g/10 minutes, a density as measured by the method of ASTM D-1505 of 0.921 g/cm$^3$ and a Q-value of 3.5.

The biaxially stretched polyethylene naphthalate film layer 20 μm in thickness and three-layer co-extruded plastic film layer IIIa were layered via an extrusion laminated adhesive layer 4, 20 μm in thickness in-between for providing a completely light-shielding layered film having a peeling strength of 580 g/15 mm. The three-layer co-extruded plastic film layer IIIa is made up of a three-layer co-extruded inflation film layer having a tear strength in the flow direction (longitudinal direction) of 55 g and a tear strength in the direction normal to the flow direct-on (transverse direction) of 468 g. The three-layer co-extruced plastic film layer IIIa has a TD/MD of 8.5, with the thermoplastic resin layer 2a exhibiting light shielding properties and thermal fusing properties being of the same resin composition as the molecular-oriented plastic film layer. The extrusion laminated adhesive layer 4 is comprised of 20 wt % of the marketed acid-modified polyolefin resin (ADOMER produced by MITSUI SEKIYU KAGAKU) and 80 wt % of marketed LDPE resin (SHOREX of MEIWA DENKO).

The tear strength of the layered film in the flow direction (longitudinal direction) is 118 g, with the tear strength thereof in the direction normal to the flow direction (transverse direction) being 127 g. The package easy-to-open for photosensitive material of FIG. 10 was molded from the layered film having the complete light shielding performance. This packaged material can be opened easily linearly with hand and was superior in anti-static properties, complete light-shielding performance, chronological heat-sealing strength, ease with which the photosensitive material can be inserted and taken out, complete hermetic sealing performance, impact strength and in Young's modulus, thus being superior as the package easy-to-open for photosensitive material.

Comparative Example 1

A thermoplastic resin film, 100 μm in thickness, having light-shielding properties and heat-fusible properties, molded from the same polyethylene-based resin composition as that used in Example 1 using a single-layer inflation molding machine, is liable to melt fracture and can be easily torn in the flow direction. In addition, if the film is used alone, it is liable to explosion during packaging or transport by the edges of the photosensitive material such that it can hardly be put to practical use.

Example 2

The Example 2 is directed to a packaged material of a band-shaped photosensitive material of FIG. 14 employing the layered film having the layered structure shown in FIG. 8. The biaxially stretched plastic film layer 1 and the adhesive layer 4 of FIG. 8 are the same as those of Example 1. Moreover, the three-layer co-extruded film layer IIIa is the same as to the resin composition and the molding method as that in Example 1 except varying the thickness of each layer 3a, 3a, 3a thereof from 25 μm each to 15 μm each. The resulting packaged material is free from curling, while being optimum in procuring complete light shielding properties and complete hermetic sealing performance since it is made of the biaxially stretched polyethylene naphthalate resin film layer having a large Young's modulus in the central part. The packaged material had other characteristics superior similarly to those of the Example 1.

Example 3

A biaxially stretched polystyrene resin film layer, 25 μm in thickness, having a tensile strength of 10 kgf/mm² (98 MPa), a tensile elastic modulus of 120 kgf/mm² (1176 MPa), a tearing propagation resistance of 3 gf/25 μm (0.03 N/25 μm), an explosion strength of 1 kg, thermal contraction (100° C.×1 minute) of 20%, water vapor transmission of 30 g/m²·24 hours and an oxygen transmission rate of 1300 cc/m²·24 hours·atm, was used in place of the biaxially stretched polyethylene naphthalate resin film layer of 20 μm thickness of the biaxially stretched plastic film layer 1 of Example 2, with the other conditions being the same as those of Example 2. The resulting product exhibits poor barrier characteristics with respect to water vapor or oxygen as compared to those of the biaxially stretched polyethylene naphthalate resin film and inferior physical strength and thermal resistance. However, the product was still within the usable range.

Example 4

(1) Plastic Film Layer Molecular-oriented in the Flow Direction

A polyolefin base resin composition, which is comprised of (A) 40 wt % of a homopolyethylene resin having an MFR (as measured by ASTM D1238-88 condition E, test temperature of 190° C. and a test load of 2.16 kgf (21.1 N)) of 0.03 g/10 minutes, a density (as measured by the method of ASTM D-1505) of 0.962 g/cm³, and a Q-value of 38; (B) 55.75 wt % of an ethylene-butene-1 copolymer resin having an MFR (as measured by ASTM D1238-88 condition E, test temperature of 190° C. and a test load of 2.16 kgf (21.2 N)) of 1.0 g/10 minutes, a density (as measured by the method of ASTM D-1505) of 0.920 g/cm³, and a Q-value of 4.5; (C) 3 wt % of furnace carbon black (#44B) as the light-shielding material manufactured by MITSUBISHI KAGAKU; (D) 0.2 wt % of synthetic silica capable of dispersing the light-shielding material; (E) 0.2 wt % of calcium stearate, as lubricant; (F) 0.2 wt % of zinc stearate as lubricant; (G) 0.5 wt % of polyoxyethylene sorbitan monostearate, as anti-static agent; and (H) 0.15 wt % of tetrakis [methylene-3 (3,5-di-tert-butyl-4-hydroxy)propionate]methane, as a hindered phenolic anti-oxidant, was prepared and used for the desired following layer. In addition, an inflation film molding device, with a lip clearance of 1.1 mm, and a ring-die of a diameter of 50 cm φ, with an extruder screw being of an L/D equal to 28, was used. Air at 20° C. was injected via a slit of a cooling ring with the resin temperature of 195° C. and a blow-up ratio of 2.2 for air cooling the composition. In this manner, a mono-layer plastic film layer, 50 μm in thickness, molecular-oriented in the flow direction and having a tear strength in the flow direction (longitudinal direction) and that in the direction normal to the flow direction (in the transverse direction) of 22 g and 550 g, respectively, was produced. The TD/MD ratio was 25. The static frictional coefficient, as measured by JIS K7125-1987 of the mono-layer plastic film layers, molecular-oriented in the flow direction, was 0.32.

The furnace carbon black of (C), is the furnace type carbon black manufactured by MITSUBISHI KAGAKU, having a mean particle size (as measured by an electron microscopic method) of 21 μm, a pH (as measured by JIS K6221) of 7.5, a DBP oil absorption amount (as measured by the oil absorption method A of JIS K6221) of 85 ml/100 g, volatile components (as measured by JIS K6221) of 0.8%, the nitrogen adsorption specific surface area (as measured by the fluidity method) of 125 m²/g, sulfur content (as measured by the ASTM D1619-60) of 0.35%, a refractive index (as measured by the Larsen oil immersion method) of 1.62, a Mohs hardness of 2, and a specific gravity (as measured by the method A of ASTM D-153) of 1.9. The synthetic silica operating as dispersion pigment of (D) as described above has a mean particle size (as measured by the electron microscope method) of 30 nm, a DBP oil absorption amount (as measured by the oil absorption method A of JIS K6221) of 205 ml/100 g, a nitrogen adsorption specific surface area (as measured by the fluidity method) of 255 m²/g, a refractive index (as measured by the Larser, oil immersion method) of 1.45, a Mohs hardness of 5, and a specific gravity (as measured by the method A of ASTM D-153) of 2.3.

(2) Biaxially Stretched Plastic Film Layer

As a light shielding material, 30 wt % of acetylene black, 10 wt % of a rutile type titanium oxide, 2 wt % of IRGANOX 1010 (commercial name) produced by CIBA GEIGY as an anti-oxidant, 0.5 wt % of erucic acid, as lubricant, 5.0 wt % of glycerin monostearate, as a non-ionic anti-static agent, 1.0 wt % of calcium stearate, having the function of making the lubricant function and the function of catalyst residues non-toxic, 10 wt % of a low molecular polyethylene-based resin having the number average molecular weight of 1200, and 41.5 wt % of the high-pressure homopolyethylene resin, were mixed in a super-mixer for 10 minutes, kneaded and extruded as strand by a uniaxial extruder having a diameter of 35 mm, a compression ratio of 1:3.5, a resin temperature of 170° C., a screw rpm of 80, with L/D being 25. The extruded product was cooled in a water bath and granulated by a cutter to cylindrically-shaped pellets each 2.5 mm in diameter and 4 mm in length to produced a master batch having the concentration of the light-shielding material of 30 wt %. The acetylene black had a mean particle size as measured by an electron microscopic method of 45 nm, an iodine adsorption amount as measured by JIS K6221 of 110 mg/g, pH (under condition of JIS K6221) of 7.0, a DBP oil absorption amount (by JIS K6221 oil absorption amount method A) of 125 ml/100 g, volatile content (volatile decrease at 950° C. on heating for 7 minutes) of 0.25%, and a Mohs hardness of 1.9. The rutile type titanium oxide had a mean particle size (as measured by the electron microscopic method) of 200 nm, a specific gravity (as measured by the ASTM D-153, method A) of 4.2, a DBP oil absorption amount (as measured by the oil absorption amount method A of JIS K6221) of 115 ml/100 g and a Mohs hardness of 6. The homopolyethylene resin by the high-pressure method had an MFR (as measured under ASTM D-1238-88, condition E, test temperature of 190° C. and a test load of 2.16 kgf (21.2N)) of 3.2 g/10 minutes and a density (under condition of ASTM D-1505) of 0.920 g/cm$^3$. Then, 10 wt % of the produced master batch and 90 wt % of the homopolypropylene resin having an MFR (ASTM D1238-77 condition L, test temperature of 230° C. and test load of 2.16 kgf (21.2 N)) of 1.0 g/10 minutes and a density (under condition of ASTM D-1505) of 0.90 g/cm$^3$ was processed by a sequential biaxial stretching method of the tenter method employing a T-die to form a light-shielding biaxially stretched plastic film layer having a thickness of 20 μm.

(3) Thermally Fusible Layer

From a polyethylene based resin composition, a thermally fusible layer 25 μm in thickness was molded using an inflation film molding device. The polyethylene based resin composition used was made up of 40 wt % of a homopolyethylene resin, having an MFR (as measured under ASTM D1238-88 condition E, test temperature of 190° C., and a test load of 2.16 kgf (21.1N) of 0.05 g/10 minutes, and a density (under ASTM D-1505) of 0.957 g/cm$^3$, 55.9 wt % of an ethylene-hexene-1 copolymer resin having an MFR (as measured under ASTM D1238-83 condition E, test temperature of 190° C. and a test load of 2.16 kgf (21.2N) of 2.0 g/10 minutes, and a density (under ASTM D-1505) of 0.920 g/cm$^3$, 0.2 wt % of zinc stearate, 0.05 wt % of hindered phenolic anti-oxidant (IRGANOX 1010 manufactured by CIBA-GEIGY), 0.05 wt % of erucic acid amide, 0.3 wt % of boric acid ester of glycerin mono-fatty acid ester, and 3.5 wt % of furnace type carbon black (#44B) manufactured by MITSUBISHI KAGAKU.

(4) The above plastic film layer, molecular-oriented in the flow direction, biaxially stretched plastic film layer and the thermoplastic resin film layer exhibiting light shielding properties and thermal fusible characteristics were layered together via an extrusion laminated adhesive layer 4 to provide a completely light shielding layered film having a peeling strength of 600 g/15 mm. The adhesive layer, having a thickness of 20 μm, was made up of 20 wt % of a marketed acid-modified polyolefin resin (Adomer produced by MITSUI SEKIYU KAGAKU) and 80 wt % of marketed LDPE resin (SHOWREX manufactured by SHOWA DENKO). From the layered film, a package easy-to-open for photosensitive material shown in FIG. 10 was formed. This packaged photosensitive material could be opened easily linearly with hand and was superior in anti-static properties, complete light-shielding performance, chronological heat-sealing strength, ease with which the photosensitive material can be inserted and taken out, complete hermetic sealing performance, impact strength and in Young's modulus, thus being superior as the package easy-to-open for photosensitive material. In addition, since the entire layered film is formed of a polyolefin resin, the film is also superior in amenability to recycling and incineration after the film is used up.

Example 5

The present Example 5 is directed to a layered film produced by using a biaxially stretched polyethylene terephthalate resin film 25 μm in thickness in place of the biaxially stretched polyethylene naphthalate resin film 20 μm in thickness of Example 1 and by layering light-shielding plastic films 50 μm in thickness molecular-oriented in the flow direction (longitudinal direction) of Example 4 on both sides of the biaxially stretched polyethylene terephthalate resin film via a polyurethane based dry laminate adhesive layer 2 μm in thickness to a peeling strength of 680 g/15 mm. The biaxially stretched polyethylene terephthalate resin film had the following characteristics.

The characteristics of the biaxially stretched polyethylene terephthalate resin film 25 μm in thickness include tensile strength according to JIS K7127 of 27 kgf/mm$^2$ (265 MPa) and 28 kgf/mm$^2$ (274 MPa) for MD and for TD, respectively; tensile elastic modulus by JIS K7127 of 480 kgf/mm$^2$ (4704 MPa) and 490 kgf/mm$^2$ (4802 MPa) for MD and for TD, respectively; tearing propagation resistance by JIS K7128 (Elemendorf) of 18 gf/25 μm (0.18 N/25 μm) and 19 gf/25 μm (0.19 N/25 μm) for MD and for TD, respectively; explosion resistance by JIS C2318 of 20 kgf/25 μm (196 N/25 μm) and 18 kgf/25 μm (176 N/25 μm) for MD and for TD, respectively; explosion strength by JIS P8122 of 19 kg; impact strength by JIS K6745 is 24 kg·cm/25 μm, number of times of flexing until destruction by JIS P8155 is not less than 10,000; melting point according to ASTMD 882-73 of 266° C.; water absorption rate by ASTMD 882-73 of 0.6%; density by ASTMD792 of 1.40 g/cm$^3$, thermal contraction rate according to JIS C2318 (150° C.×30 minutes) of 1.8% and 0.6% for MD and for TD, respectively; water vapor transmission rate according to JIS Z0208-73 (40° C., 90% RH) of 6 g/m$^2$·24 hours; and an oxygen transmission rate according to ASTMD882-73 (20° C., 0% RH) of 9 cc/m$^2$·24 hours·atm.

The layered film had a tear strength in the flow direction thereof (longitudinal direction) of 79 g which was well-balanced to that in the direction normal to the flow direction (in the transverse direction) of 82 g. This layered film was used for producing a packaged band-shaped photosensitive material of FIG. 14. This packaged band-shaped photosensitive material was superior in amenability to packaging and in physical strength. Since the light-shielding plastic film layer molecular-oriented in the flow direction (longitudinal direction) is laminated on each side of the biaxially stretched polyethylene terephthalate resin film layer having a high Young's modulus (=tensile elastic modulus), if one of the molecular-oriented light-shielding plastic film layer is ruptured, the remaining layer assures the complete light shielding performance reliably. Since the light-shielding plastic film layer, strongly molecular-oriented in the flow direction (TD/MD=25) is used, the packaged material can be opened easily linearly in the flow direction, so that it is superior as a package easy-to-open for photosensitive material.

Comparative Example 2

A layered film, obtained by layering two light-shielding plastic film layers, 50 μm in thickness, molecular-oriented in the flow direction (longitudinal direction) of Example 4, with the interposition of an extrusion laminate adhesive layer of Example 4 of 20 μm in thickness, was easily torn during the packaging and transport steps so that light-shielding performance could not be maintained easily and hence the film could not be put to practical use.

Example 6

By employing the layered film of Example 5 as an envelope for lateral side of the packaged material of the roll-shaped photosensitive material of FIG. 15, complete light-shielding performance could be secured. In addition, the packaged material could be opened easily linearly in the flow direction, so that the packaged material was superior as a package easy-to-open for photosensitive material.

The package easy-to-open for photosensitive material according to the present invention is not lowered in impact strength or heat-sealing strength with lapse of time, such that, if the packaged photosensitive material is formed as a roll-shaped packaged photosensitive material or the sheet-shaped packaged photosensitive material weighing not less than 500 g, complete hermetic sealing or complete light shielding performance can be assured in the transportation process or after prolonged storage. The package easy-to-open for photosensitive material is superior in easy-to-open characteristics and can be opened easily linearly in a dark room, while having heat-sealing stability and appropriate rigidity. Moreover, since the package easy-to-open for photosensitive material is superior in amenability to heat-sealing, it can be easily produced so that the state of complete hermetic sealing and complete light shielding is maintained at all times.

Since the packaged photosensitive material is superior in easy-to-open characteristics, it can be torn nearly without the necessity of providing an opening notch, while complete tight sealing and complete light shielding can be assured without worsening the characteristics required as the packaged photosensitive material. Since the easy-to-open characteristics can be maintained without using an aluminum foil thought to be indispensable for assuring the easy-to-open characteristics, the packaged photosensitive material is superior in amenability to recycling and to disposal by incineration.

On the other hand, a packaged photosensitive material, obtained on employing a layered film comprised of a biaxially stretched plastic film layer on the inner side of which directed to the photosensitive material is layered a light-shielding plastic film layer with or without interposition of an adhesive layer and on the outer side of which opposite to the photosensitive material is layered another light-shielding plastic film layer with or without interposition of an adhesive layer in a substantially symmetrical structure, is liable to curling to a lesser extent and improved significantly in working performance since it is unnecessary to discriminate the front and back sides of the layered film in a dark room where the packaged photosensitive material is produced. In addition, the light-shielding plastic film layer has a larger Young's modulus and is layered on each side of the biaxially stretched plastic film layer superior in impact strength, so that, if pinholes or rupture is produced in one of the light-shielding plastic film layers, complete hermetic sealing and complete light shielding performance can be assured by the opposite side light-shielding plastic film layer including the thermally fusible layer and the like.

What is claimed is:

1. A package for photosensitive material made of a layered film exhibiting complete light-shielding characteristics comprising a biaxially stretched plastic film layer and a thermoplastic resin film layer containing at least 5 wt % of an ethylene copolymer resin and/or a thermoplastic elastomer, at least one layer of said layered film being a light-shielding layer exhibiting light-shielding characteristics, at least one layer other than said biaxially stretched plastic film layer being a molecular oriented plastic film layer having a ratio of the tear strength in a direction normal to the flowing direction to that in the flowing direction of not less than 3;

wherein said molecular oriented plastic film layer is comprised of an ethylene-based resin film comprising:

(A) 5 to 90 parts by weight of an ethylene-α-olefin copolymer resin having an MFR of 0.1 to 10 g/10 minutes, a density of 0.870 to 0.939 g/cm$^3$ and a Q-value of not more than 15; and (B) 10 to 95 parts by weight of a high density homopolyethylene resin and/or an ethylene-α-olefin copolymer resin having an MFR of 0.01 to 1.5 g/10 minutes, a density of 0.940 to 0.985 g/cm$^3$ and a Q-value of not less than 16.

2. The package for photosensitive material according to claim 1, wherein said molecular oriented plastic film layer contains one or more light-shielding materials in the amount of 0.05 to 40 wt %.

3. The package for photosensitive material according to claim 2, wherein the molecular oriented plastic film layer is a non-stretched molecular oriented ethylene-based resin film.

4. The package for photosensitive material according to claim 1, wherein said molecular oriented plastic film layer contains metal salts of fatty acids in an amount of 0.01 to 5 wt %.

5. The package for photosensitive material according to claim 4, wherein the molecular oriented plastic film layer is a non-stretched molecular oriented ethylene-based resin film.

6. The package for photosensitive material according to claim 1, wherein said molecular oriented plastic film layer is one or more layers.

7. The package for photosensitive material according to claim 6, wherein the molecular oriented plastic film layer is a non-stretched molecular oriented ethylene-based resin film.

8. The package for photosensitive material according to claim 1, wherein the molecular oriented plastic film layer is a non-stretched molecular oriented ethylene-based resin film.

9. The package for photosensitive material according to claim 1, wherein said thermoplastic resin film layer contains one or more light-shielding materials in an amount of 0.05 to 40 wt %.

10. The package for photosensitive material according to claim 1, wherein said thermoplastic resin film layer serves as one or both of said light-shielding layer and said molecular oriented plastic film layer.

11. The package for photosensitive material according to claim 10, wherein said thermoplastic resin layer contains carbon black in an amount of 0.05 to 40 wt % having a DBP oil absorption amount of 10 to 350 ml/100 g and a sulfur content of not higher than 1 wt % as the light-shielding material.

12. The package for photosensitive material according to claim 11, wherein said carbon black is carbon black having a cyan compound of not more than 0.05 wt %.

13. The package for photosensitive material according to claim 11, wherein said carbon black is a carbon black having an aldehyde compound of not more than 0.5 wt % as measured by the iodine method.

14. The package for photosensitive material according to claim 1, wherein said light-shielding layer contains carbon black as the light-shielding material in an amount of 0.05 to 40 wt %.

15. The package for photosensitive material according to claim 14, wherein said light-shielding layer further contains a dispersion pigment having a Mohs hardness of not less than 1.5 times that of carbon black.

16. The package for photosensitive material according to claim 14, wherein the surface of said carbon black is treated with a surface coating material.

17. The package for photosensitive material according to claim 1, wherein said biaxially stretched plastic film layer has a thickness of 5 to 125 μm, a tensile strength (MD) of not less than 10 kgf/mm$^2$, a tensile elastic modulus (MD) of not less than 100 kgf/mm$^2$, and a tearing propagation resistance (MD) of 3 to 40 gf/25 μm.

18. The package for photosensitive material according to claim 1, wherein said biaxially stretched plastic film layer is a biaxially stretched polyethylene naphthalate resin film.

* * * * *